(12) United States Patent
Cypher

(10) Patent No.: US 6,393,597 B1
(45) Date of Patent: May 21, 2002

(54) MECHANISM FOR DECODING LINEARLY-SHIFTED CODES TO FACILITATE CORRECTION OF BIT ERRORS DUE TO COMPONENT FAILURES

(75) Inventor: Robert Cypher, Los Gatos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/323,328

(22) Filed: Jun. 1, 1999

(51) Int. Cl.[7] .......................... H03M 13/00; G06F 11/00
(52) U.S. Cl. ...................... 714/785; 714/755; 714/803; 714/804
(58) Field of Search ............................... 714/755, 803, 714/804, 785

(56) References Cited

U.S. PATENT DOCUMENTS

| | | | | |
|---|---|---|---|---|
| 4,881,232 A | * | 11/1989 | Sako et al. ................... | 714/755 |
| 4,995,041 A | * | 2/1991 | Hetherington et al. | |
| 5,450,340 A | * | 9/1995 | Nicolaidis ................... | 708/531 |
| 5,612,965 A | * | 3/1997 | Michaelson | |
| 5,642,366 A | * | 6/1997 | Lee et al. ................... | 714/762 |
| 5,831,999 A | * | 11/1998 | Yamamura ................... | 714/755 |
| 5,872,799 A | * | 2/1999 | Lee et al. ................... | 714/755 |

FOREIGN PATENT DOCUMENTS

GB   2 216 690   * 10/1989

OTHER PUBLICATIONS

International Search Report, Application No. PCT/US 00/14852, mailed Sep. 27, 2000.
Burskirk, "32–Bit–Wide Memory Tolerates Failures," NT Tech Notes, Oct. 1990, p. 818.*
Dell, "A White Paper on the Benefits of Chipkill–Correct ECC for PC Server Main Memory," IBM Microelectronics Division, Nov. 1997, pp. 1–23.
"Parallel Parity," http://bbs–koi.uniinc.msk.ru/tech1/1994/er_cont/block.htm, 1994, 1 pg.

(List continued on next page.)

*Primary Examiner*—Albert Decady
*Assistant Examiner*—Joseph D. Torres
(74) *Attorney, Agent, or Firm*—Conley, Rose & Tayon, PC; B. Noël Kivlin

(57) ABSTRACT

A mechanism for decoding linear shifted codes employs two shift registers. The shift registers are independently controlled by an associated control unit. Initially, the received parity bits are stored in a first shift register and the global syndrome bits are stored in a second shift register. While the right-most cell in the first shift register contains a logical "0", both shift registers are shifted right one position. When the right-most cell of the first shift register contains a "1", the content of the right-most cell of the second shift register is recorded as a first bit of a syndrome code which identifies the position of an error with any groups with an error. If the value recorded is a "1", a bit-wise exclusive OR operation is then performed on the values in the first and second shift registers, and the result is stored in the second shift register. Subsequently, the contents of the second shift register are shifted by one position. Similar to the previous operation, the content of the right-most cell of the second shift register is again recorded, this time as the next bit of the syndrome code. A bit-wise exclusive OR is again conditionally performed upon the values in the first and second shift registers depending upon whether the last recorded bit was a "1" (and the result is stored in the second shift register), and the contents of the second shift register are shifted. These steps are repeated until all L bits of the syndrome code identifying a failed component have been recorded (where L is the smallest integer such that $2^L >= M$, where M is the number of components used).

24 Claims, 31 Drawing Sheets

OTHER PUBLICATIONS

"Modulo–2 Arithmetic," http://bbs–koi.uniinc.msk.ru/tech1/1994/er_cont/modulo.htm, 1994. 1 pg.

"Introduction to Error Control," http://bbs–koi.uniinc.msk.ru/tech1/1994/er_cont/intro.htm, 1994, 1 pg.

Barker et al. "ASCII Table," http://www.eng2.uconn.edu/cse/Cour . . . 08W/References/ Ref_ASCIITable.html, Feb. 1998, 1 pg.

"Parity & Computing parity," http://bbs–koi.uniinc.msk.ru/tech1/1994/er_cont/parity.htm, 1994, 2 pgs.

"Error Correction with Hamming Codes," http://bbs–koi.uniinc.msk.ru/tech1/1994/er_cont/hamming.htm, 1994, 2 pgs.

Barker et al. "Hamming Code, Background Information," http://www.eng2.uconn.edu/cse/Courses/CSE208W/Hamming/Background.html, Feb. 1998, 3 pgs.

Barker et al., "Jamming Code, Theory," http://www.eng2.uconn.edu/cse/Courses/CSE208W/Hamming/Theory.html, Mar. 1998, 2 pgs.

"NUMA: Delivering the Next Level of Commodity SMP Performance," http://199.245.235.23/newsletters/html/vpoint5.html, 1996, 4 pgs.

Barker et al. "General Definitions," http://www.eng2.uconn.edu/cse/Cour . . . 8W/References/Ref_Definitions.html, Feb. 1998, 3 pgs.

Barker et al. "Hamming Code, Lab Procedure," http://www.eng2.uconn.edu/cse/Courses/CSE208W/Hamming/Procedure.html, Jun. 1998, 3 pgs.

* cited by examiner

| CHECK BIT | DATA BITS |
|-----------|-----------|
| P1 | D4,D3,D1 |
| P2 | D4,D2,D1 |
| P3 | D3,D2,D1 |

DATA BLOCK

| BIT POSITION | 1 | 2 | 3 | 4 | 5 | 6 | 7 |
|---|---|---|---|---|---|---|---|
| PARITY / DATA BIT | P1 | P2 | D4 | P3 | D3 | D2 | D1 |

*FIG. 3*
(Prior Art)

| RECEIVED BITS | SYNDROME |
|---|---|
| P1, D4, D3, D1 | S1 |
| P2, D4, D2, D1 | S2 |
| P3, D3, D2, D1 | S3 |

*FIG. 4*
(Prior Art)

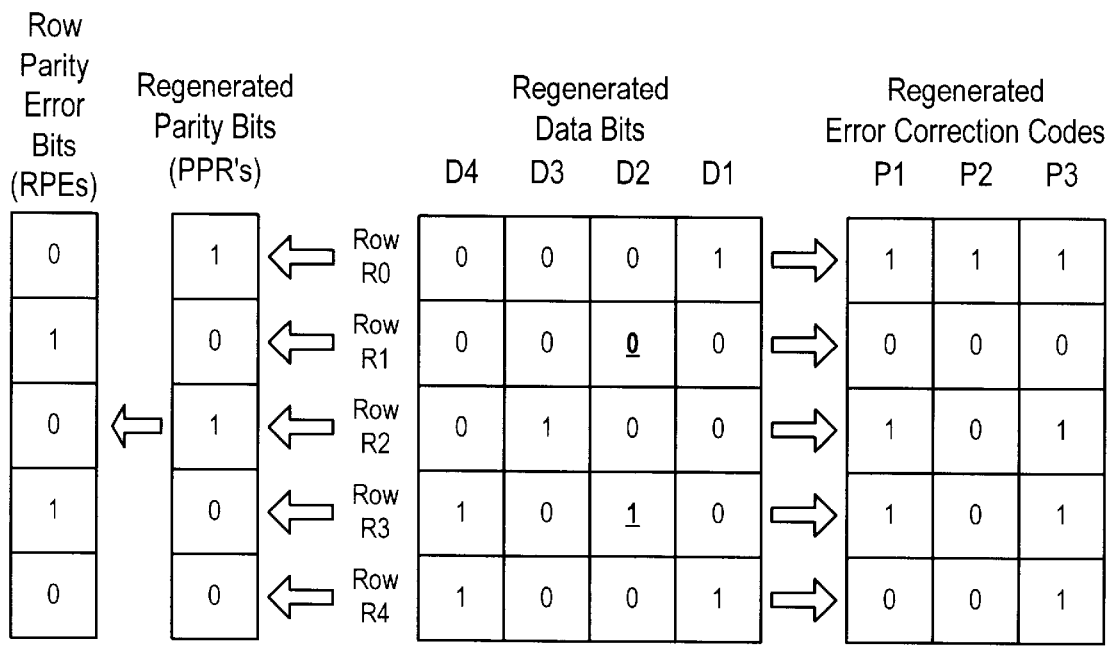
*FIG. 7A*
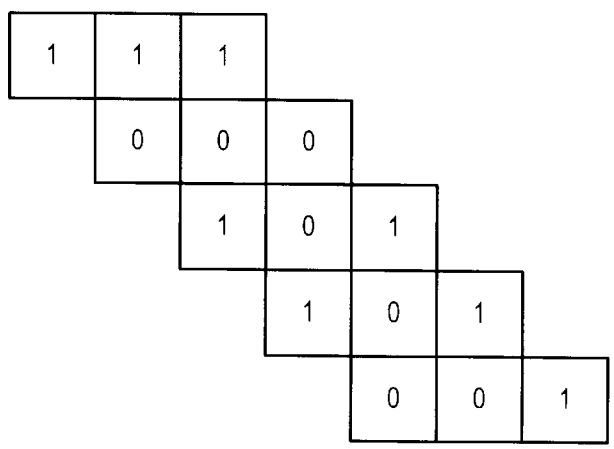
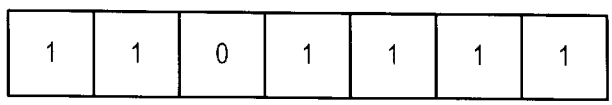
*FIG. 7B*

FIG. 20

Parity Generation Matrix for Group G[0]

FIG. 21

Parity Generation Matrix for Group G[1]

FIG. 22

Parity Generation Matrix for Group G[2]

FIG. 23

Parity Generation Matrix for Group G[3]

FIG. 24

Parity Generation Matrix for Group G[4]

| G[4]: | 0 0 | 0 1 | 0 2 | 0 3 | 0 4 | 0 5 | 0 6 | 0 7 | 0 8 | 0 9 | 1 0 | 1 1 | 1 2 | 1 3 | 1 4 | 1 5 | 1 6 | 1 7 | 1 8 | 1 9 | 2 0 | 2 1 | 2 2 | 2 3 | 2 4 | 2 5 | 2 6 | 2 7 | 2 8 | 2 9 | 3 0 | 3 1 | 3 2 | 3 3 | 3 4 | 3 5 |
|---|---|---|---|---|---|---|---|---|---|---|---|---|---|---|---|---|---|---|---|---|---|---|---|---|---|---|---|---|---|---|---|---|---|---|---|---|
| Holds: | P4 | D131 | D132 | D133 | D134 | D135 | D136 | D137 | D138 | D139 | D140 | D141 | D142 | D143 | D144 | D145 | D146 | D147 | D148 | D149 | D150 | D151 | D152 | D153 | D154 | D155 | D156 | D157 | D158 | D159 | D160 | D161 | T9 | D162 | D163 | D164 |
| P[7] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| P[6] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| P[5] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| P[4] | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| P[3] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| P[2] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| P[1] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| P[0] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| T[12] | 0 | 0 | 1 | 0 | 0 | 0 | 0 | 0 | 0 | 0 | 1 | 0 | 0 | 0 | 0 | 0 | 0 | 0 | 1 | 1 | 1 | 1 | 1 | 1 | 1 | 1 | 1 | 1 | 1 | 1 | 1 | 1 | 0 | 1 | 1 | 1 |
| T[11] | 0 | 1 | 1 | 0 | 0 | 0 | 0 | 1 | 0 | 0 | 0 | 0 | 0 | 1 | 1 | 0 | 0 | 0 | 0 | 0 | 1 | 1 | 0 | 0 | 0 | 1 | 1 | 0 | 1 | 1 | 1 | 1 | 0 | 0 | 0 | 0 |
| T[10] | 0 | 0 | 0 | 1 | 0 | 0 | 0 | 0 | 0 | 0 | 1 | 0 | 1 | 0 | 1 | 0 | 0 | 0 | 0 | 1 | 1 | 0 | 1 | 1 | 0 | 0 | 0 | 1 | 1 | 1 | 1 | 0 | 0 | 0 | 0 | 0 |
| T[9] | 0 | 0 | 1 | 1 | 0 | 1 | 1 | 1 | 0 | 1 | 0 | 1 | 1 | 1 | 1 | 1 | 0 | 1 | 1 | 0 | 0 | 1 | 1 | 1 | 0 | 0 | 0 | 0 | 0 | 0 | 0 | 0 | 0 | 0 | 0 | 0 |
| T[8] | 0 | 0 | 1 | 0 | 0 | 0 | 0 | 0 | 1 | 0 | 0 | 1 | 0 | 0 | 1 | 1 | 1 | 0 | 0 | 0 | 0 | 0 | 0 | 0 | 0 | 0 | 0 | 0 | 0 | 0 | 0 | 0 | 0 | 0 | 0 | 0 |
| T[7] | 0 | 0 | 0 | 0 | 0 | 1 | 1 | 1 | 0 | 0 | 1 | 1 | 0 | 1 | 0 | 1 | 0 | 1 | 0 | 0 | 0 | 0 | 0 | 0 | 0 | 0 | 0 | 0 | 0 | 0 | 0 | 0 | 0 | 0 | 0 | 0 |
| T[6] | 0 | 0 | 0 | 0 | 0 | 0 | 1 | 1 | 0 | 0 | 1 | 0 | 0 | 0 | 0 | 1 | 1 | 0 | 0 | 0 | 0 | 0 | 0 | 0 | 0 | 0 | 0 | 0 | 0 | 0 | 0 | 0 | 0 | 0 | 0 | 0 |
| T[5] | 0 | 0 | 0 | 0 | 0 | 1 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| T[4] | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| T[3] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| T[2] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| T[1] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| T[0] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

Figure 25:
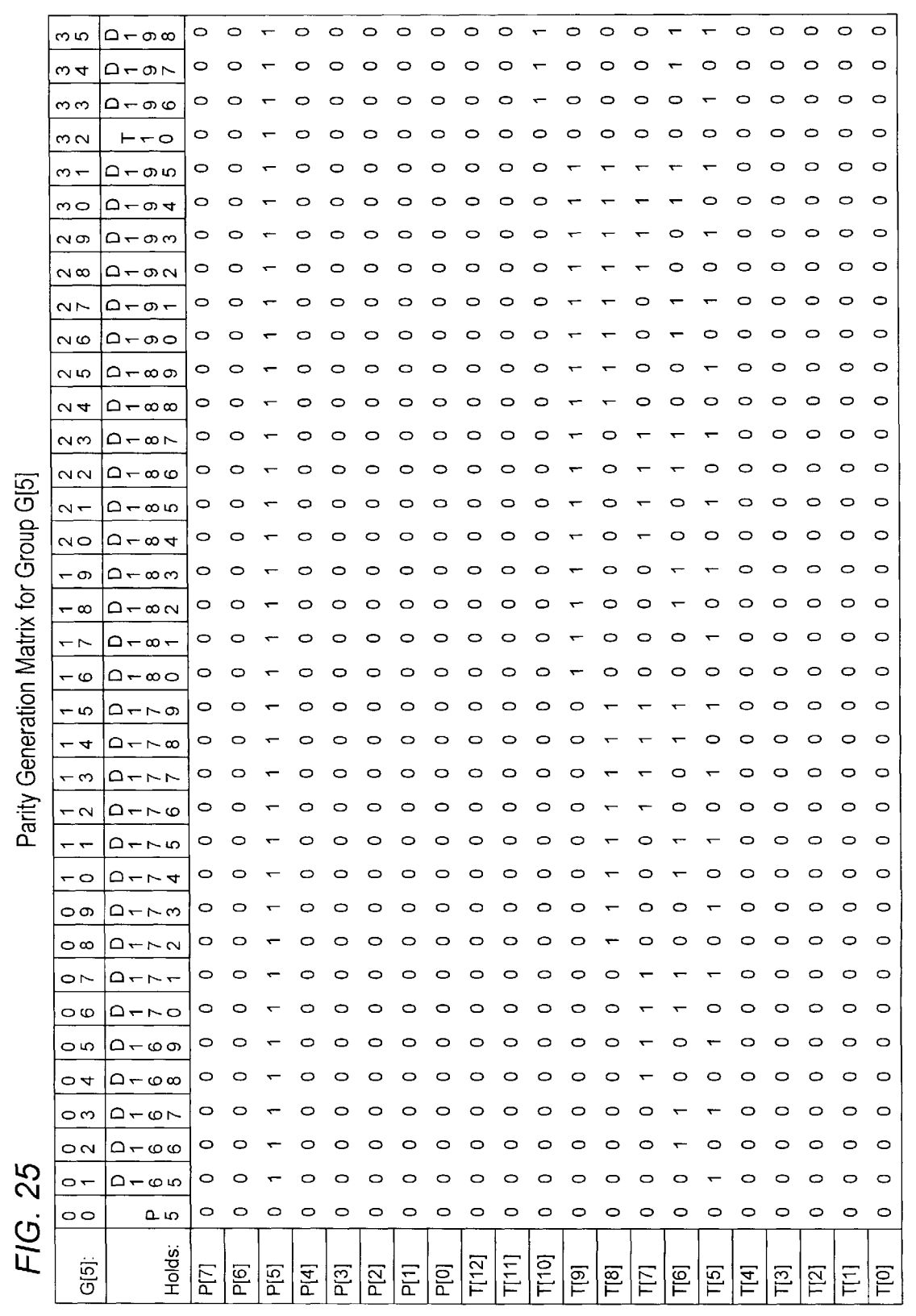

FIG. 25 Parity Generation Matrix for Group G[5]

FIG. 26

Parity Generation Matrix for Group G[6]

FIG. 27

Parity Generation Matrix for Group G[7]

FIG. 28

Parity Check Matrix for Group G[0]

FIG. 29

Parity Check Matrix for Group G[1]

Figure 30:
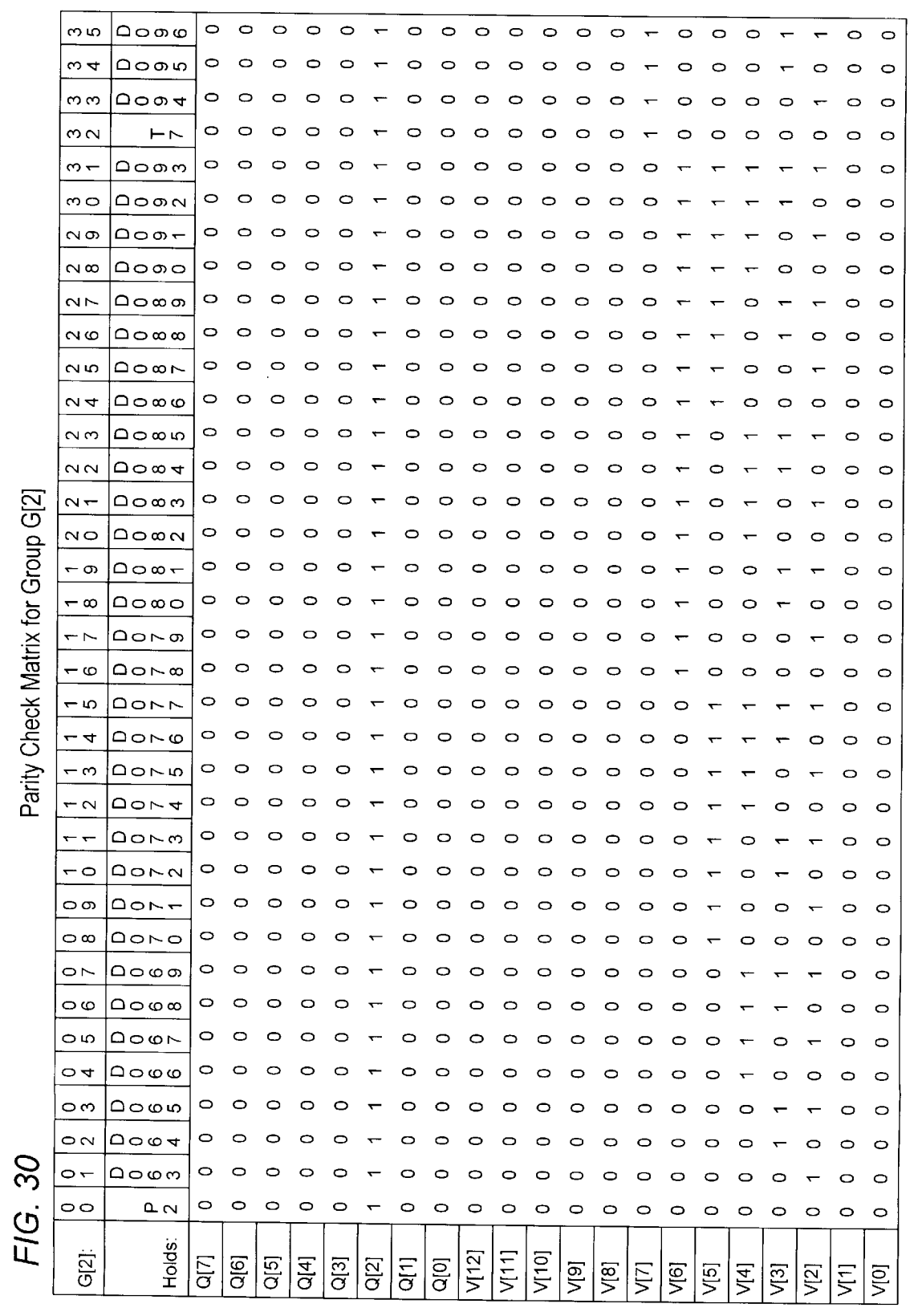

FIG. 30 Parity Check Matrix for Group G[2]

FIG. 31

Parity Check Matrix for Group G[3]

FIG. 32

Parity Check Matrix for Group G[4]

FIG. 33

Parity Check Matrix for Group G[5]

FIG. 34

Parity Check Matrix for Group G[6]

| G[6]: | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|---|
| Holds: | P6 | D199 | D200 | D201 | D202 | D203 | D204 | D205 | D206 | D207 | D208 | D209 | D210 | D211 | D212 | D213 | D214 | D215 | D216 | D217 | D218 | D219 | D220 | D221 | D222 | D223 | D224 | D225 | D226 | D227 | D228 | D229 | 111 | D230 | D231 | D232 |
| Q[7] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Q[6] | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| Q[5] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Q[4] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Q[3] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Q[2] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Q[1] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 |
| Q[0] | 0 | 0 | 1 | 1 | 1 | 0 | 0 | 0 | 1 | 1 | 1 | 0 | 1 | 1 | 1 | 1 | 0 | 1 | 1 | 1 | 1 | 1 | 1 | 1 | 1 | 0 | 1 | 1 | 0 | 0 | 1 | 0 | 1 | 1 | 1 | 1 |
| V[12] | 0 | 1 | 0 | 1 | 1 | 0 | 0 | 0 | 0 | 0 | 0 | 1 | 0 | 0 | 0 | 1 | 0 | 0 | 1 | 1 | 0 | 0 | 0 | 0 | 1 | 1 | 0 | 0 | 1 | 1 | 1 | 1 | 0 | 0 | 0 | 0 |
| V[11] | 1 | 0 | 0 | 1 | 0 | 0 | 1 | 1 | 0 | 1 | 0 | 1 | 0 | 0 | 1 | 1 | 0 | 0 | 0 | 0 | 0 | 1 | 1 | 0 | 0 | 1 | 0 | 0 | 1 | 1 | 1 | 1 | 0 | 0 | 0 | 0 |
| V[10] | 0 | 0 | 0 | 0 | 0 | 0 | 1 | 1 | 0 | 1 | 0 | 0 | 0 | 0 | 1 | 1 | 0 | 1 | 0 | 0 | 1 | 1 | 0 | 1 | 0 | 0 | 1 | 0 | 1 | 0 | 0 | 0 | 0 | 1 | 1 | 1 |
| V[9] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[8] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[7] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[6] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[5] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[4] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[3] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[2] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[1] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[0] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 35

Parity Check Matrix for Group G[7]

| G[7]: | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|---|
| Holds: | P7 | D233 | D234 | D235 | D236 | D237 | D238 | D239 | D240 | D241 | D242 | D243 | D244 | D245 | D246 | D247 | D248 | D249 | D250 | D251 | D252 | D253 | D254 | D255 | D256 | D257 | D258 | D259 | D260 | D261 | D262 | D263 | T-T2 | D264 | D265 | D266 |
| Q[7] | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| Q[6] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Q[5] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Q[4] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Q[3] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Q[2] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Q[1] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Q[0] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 |
| V[12] | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 | 0 | 0 | 0 | 0 |
| V[11] | 0 | 0 | 0 | 0 | 0 | 0 | 0 | 0 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 |
| V[10] | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 |
| V[9] | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| V[8] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[7] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[6] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[5] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[4] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[3] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[2] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[1] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[0] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

US 6,393,597 B1

MECHANISM FOR DECODING LINEARLY-SHIFTED CODES TO FACILITATE CORRECTION OF BIT ERRORS DUE TO COMPONENT FAILURES

BACKGROUND OF THE INVENTION

1. Field of the Invention

This invention relates to error correction in electronic systems and, more particularly, to systems that employ error correction codes to facilitate correction of bit errors due to, for example, component failures.

2. Description of the Related Art

Error codes are commonly used in electronic systems to detect and correct data errors, such as transmission errors or storage errors. For example, error codes may be used to detect and correct errors in data transmitted via a telephone line, a radio transmitter, or a compact disc laser. Error codes may additionally be used to detect and correct errors associated with data stored in the memory of computer systems. One common use of error codes is to detect and correct errors of data transmitted on a data bus of a computer system. In such systems, error correction bits, or check bits, may be generated for the data prior to its transfer or storage. When the data is received or retrieved, the check bits may be used to detect and correct errors within the data.

Component failures are a common source of error in electrical systems. Faulty components may include faulty memory chips or faulty data paths provided between devices of a system. Faulty data paths can result from, for example, faulty pins, faulty data traces, or faulty wires.

Hamming codes are a commonly used type of error code. The check bits in a Hamming code are parity bits for portions of the data bits. Each check bit provides the parity for a unique subset of the data bits. If an error occurs (i.e. one or more of the data bits change state), one or more of the check bits upon regeneration will also change state (assuming the error is within the class of errors covered by the code). By determining the specific bits of the regenerated check bits that changed state, the location of the error within the data may be determined. For example, if one data bit changes state, this data bit will cause one or more of the regenerated check bits to change state. Because each data bit contributes to a unique group of check bits, the check bits that are modified will identify the data bit that changed state. The error may be corrected by inverting the bit identified as being erroneous.

One common use of Hamming codes is to correct single bit errors within a group of data. Generally speaking, the number of check bits must be large enough such that $2^k-1$ is greater than or equal to n+k where k is the number of check bits and n is the number of data bits. Accordingly, seven check bits are typically required to implement a single error correcting Hamming code for 64 data bits. A single error correcting Hamming code is capable of detecting and correcting a single error.

FIGS. 1–3 illustrate an example of a system employing a single-error correction (SEC) Hamming code. In this example, four data bits (D4, D3, D2, and D1) are protected using three check bits (P1, P2, and P3). The parity generator 10 (FIG. 1) is used to encode the data block that contains the data bits and the check bits. The encoding process is performed prior to storing or communicating the data. FIG. 2 shows an assignment of data bits to calculate the check bits. In this example, the check bit P1 is generated by an XOR (exclusive OR) of the binary values in D4, D3, and D1. Similarly, the check bit P2 is generated by an XOR of the binary values in D4, D2, and D1, and the check bit P3 is generated by an XOR of the binary values in D3, D2 and D1. FIG. 3 shows the bit positions and the corresponding content of these positions within the encoded data block. The data block, which includes the data bits and the generated check bits, may then be stored in a memory chip or communicated over a data communication path.

At the point of receipt, the data block is retrieved and decoded. The decoding process involves performing a validity check on the received word, and executing an error correction technique if an error was detected. To check whether an error occurred in the storage (or transmission) of the data block, the check bits P1, P2, and P3 are effectively regenerated using the received data, and each regenerated check bit is XORed with the corresponding received check bit to generate a corresponding syndrome bit. FIG. 4 is a table depicting a manner in which these syndrome bits may be generated. More particularly, syndrome bit S1 may be generated by XORing the received binary values in P1, D4, D3, and D1. If none of the received data bits (D4, D3, D1) is erroneous, the value of the received check bit P1 is effectively XORed with itself, and the syndrome bit S1 will be 0 (assuming the original check bit P1 is not erroneous). If one of the data bits (D4, D3, D1) or the check bit P1 is erroneous, the syndrome bit S1 will be 1 (asserted), thus indicating an error. Syndrome bits S2 and S3 may be generated similarly. Taken collectively, the syndrome bits S1, S2 and S3 may be used to identify the location of an erroneous bit. For example, the binary value of the syndrome bits in the order [S3, S2, S1] indicates the position of the erroneous bit within the 7 bit data block as depicted in FIG. 3. If the syndrome code is all zeros (i.e. "000"), the data has no single bit error. Upon identification of the erroneous bit position, the error is corrected by inverting the binary value in that position, i.e. from 0 to 1 or from 1 to 0.

It is a common practice to store data in, or communicate data through, multiple components. For example, a data block may be stored in a plurality of memory chips, or it may be communicated through a plurality of wires. An error may be introduced if one of the components is faulty. A Hamming code such as that described above may be used to address error correction in such systems.

For example, consider the case of storing D bits of data that are protected by C check bits using M memory chips. The data block therefore contains D+C bits. If the data block is to be evenly divided among the M memory chips, each memory chip will store X of the data and/or check bits of the data block, where X=(D+C)/M. The standard approach to providing error correction for chip failures is to divide the D+C data and check bits into X logical groups each including M bits, and assigning 1 bit from each chip to each of the groups. The check bits in each group form a SEC (single-error correcting) code such as a Hamming code. When any chip fails, it introduces at most one error into each group, and these errors are corrected independently using the SEC codes. If a Hamming code is used in each group, a total of C=X*L check bits are required, where L is the smallest integer such that $2^L>M$. This standard approach is inefficient because each group is able to independently identify which bit (if any) within the group is in error. However, if the only failures considered are memory chip failures, the failures in different groups are highly correlated.

It would be desirable to provide a system and method which allow for the reliable storage or transmission of data in environments wherein component failures are possible. In particular, it would be desirable to provide a system and method which allows errors in data to be detected and corrected while reducing the number of check bits which must be transmitted or stored. It would further be desirable to provide a simple mechanism for decoding the set of check bits to thereby identify a position of one or more bit errors due to, for example, a faulty component.

SUMMARY OF THE INVENTION

The problems outlined above may in large part be solved by a mechanism for decoding linearly-shifted codes for detecting and correcting errors in a data block in accordance with the present invention. In one embodiment, the mechanism is used in conjunction with a system which employs a check bits generation unit that receives and encodes data to be protected. The check bits generation unit effectively partitions the data into a plurality of logical groups. The check bits generation unit generates a parity bit for each of the logical groups, and additionally generates a global error correction.

The global error correction code is indicative of a predetermined combination of a set of error correction codes each individually associated with a corresponding logical group. In various embodiments, the global error correction code is equivalent to the result of generating individual error correction codes for each logical group and combining them in a predetermined manner.

In one particular embodiment, the data is divided into a total of X logical groups. The global error correction code may be equivalent to the result of (or may be derived by) shifting the error correction code for a given ith group by i bit positions, wherein i=0 to X−1, and by XORing corresponding columns of the resulting shifted error correction codes together. The global error correction code, which in this case is referred to as having "twisted check" bits (by virtue of the selective shifting of the individual error correction codes), thus includes a separate bit indicating the parity for each aligned column formed by the collection of resulting shifted error correction codes. The data along with the parity bit for each logical group and the global error correction code are then conveyed through a communication channel or are stored in memory.

An error correction unit including the mechanism for decoding the linearly-shifted codes is coupled to receive the plurality of data bits and the check bits following storage or transmission. The error correction unit is configured to generate a parity error bit for each of the logical groups of data based on the received data bits. The error correction unit may further be configured to generate a regenerated global error correction code in the same manner in which the original global error correction code is derived. Thus, in one embodiment, the regenerated global error correction code is equivalent to the result of (or may be derived by) shifting the regenerated error correction code for a given ith group by i bit positions, wherein i=0 to X−1, and by XORing corresponding columns of the resulting shifted error correction codes together.

A global syndrome code may be generated by XORing the original global error correction code with the regenerated global error correction code. This global syndrome code is indicative of a difference between the original global error correction code and the regenerated global error correction code.

The mechanism for decoding the linear shifted codes employs two shift registers, each cell of which contains a single bit. The shift registers are independently controlled by an associated control unit. In one particular embodiment, when a shift register is controlled such that its contents are shifted, the content of each cell is shifted one position to the right, the value in the right-most cell is discarded, and a logical low value (or "0") is loaded into the left-most cell. Initially, the received parity bits are stored in a first shift register and the global syndrome bits are stored in a second shift register. While the right-most cell in the first shift register contains a logical "0", both shift registers are shifted right one position. When the right-most cell of the first shift register contains a "1", the content of the right-most cell of the second shift register is recorded as a first bit of a syndrome code which identifies the position of an error with any groups with an error. If the value recorded is a "1", a bit-wise exclusive OR operation is then performed on the values in the first and second shift registers, and the result is stored in the second shift register. Subsequently, the contents of the second shift register are shifted by one position. Similar to the previous operation, the content of the right-most cell of the second shift register is again recorded, this time as the next bit of the syndrome code. A bit-wise exclusive OR is again conditionally performed upon the values in the first and second shift registers depending upon whether the last recorded bit was a "1" (and the result is stored in the second shift register), and the contents of the second shift register are shifted. These steps are repeated until all L bits of the syndrome code identifying a failed component have been recorded (where L is the smallest integer such that $2^L>=M$, where M is the number of components used).

Advantageously, the mechanism for decoding the linearly shifted codes is relatively simple in comparison to other potential solutions for decoding received check bits, such as techniques using Gaussian Elimination, which typically involve complex procedures.

BRIEF DESCRIPTION OF THE DRAWINGS

Other objects and advantages of the invention will become apparent upon reading the following detailed description and upon reference to the accompanying drawings in which:

FIG. 3 (prior art) is an illustration of bit positions and their content for a data block encoded by the parity generator of FIG. 1;

FIG. 4 (prior art) is an assignment table for generating a syndrome code;

FIG. 7A illustrates a manner in which a set of row parity error bits and regenerated error correction codes may be generated;

FIG. 7B illustrates a manner in which a regenerated global error correction code may be generated;

Figure 20:
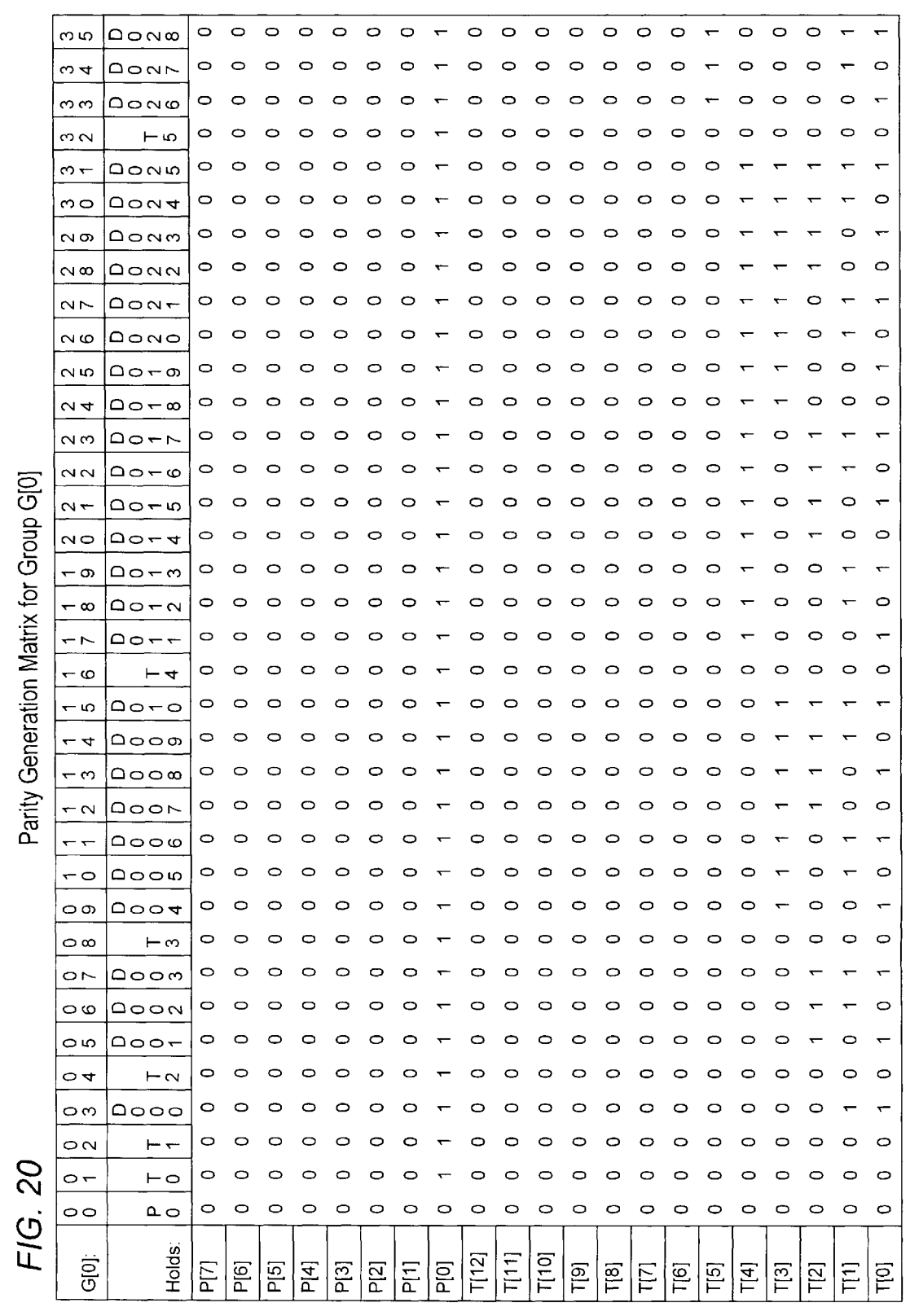
Figure 21:
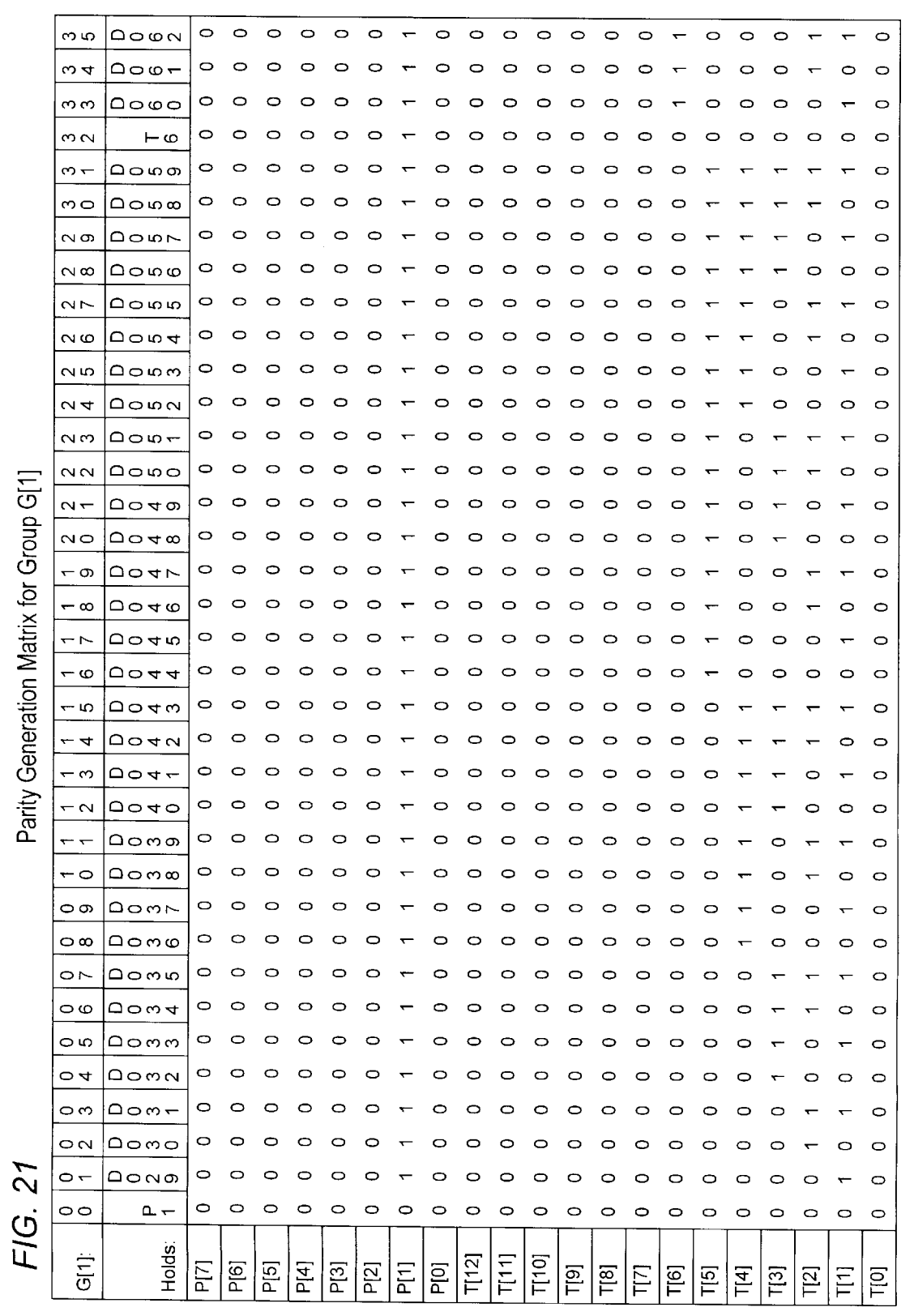
Figure 22:
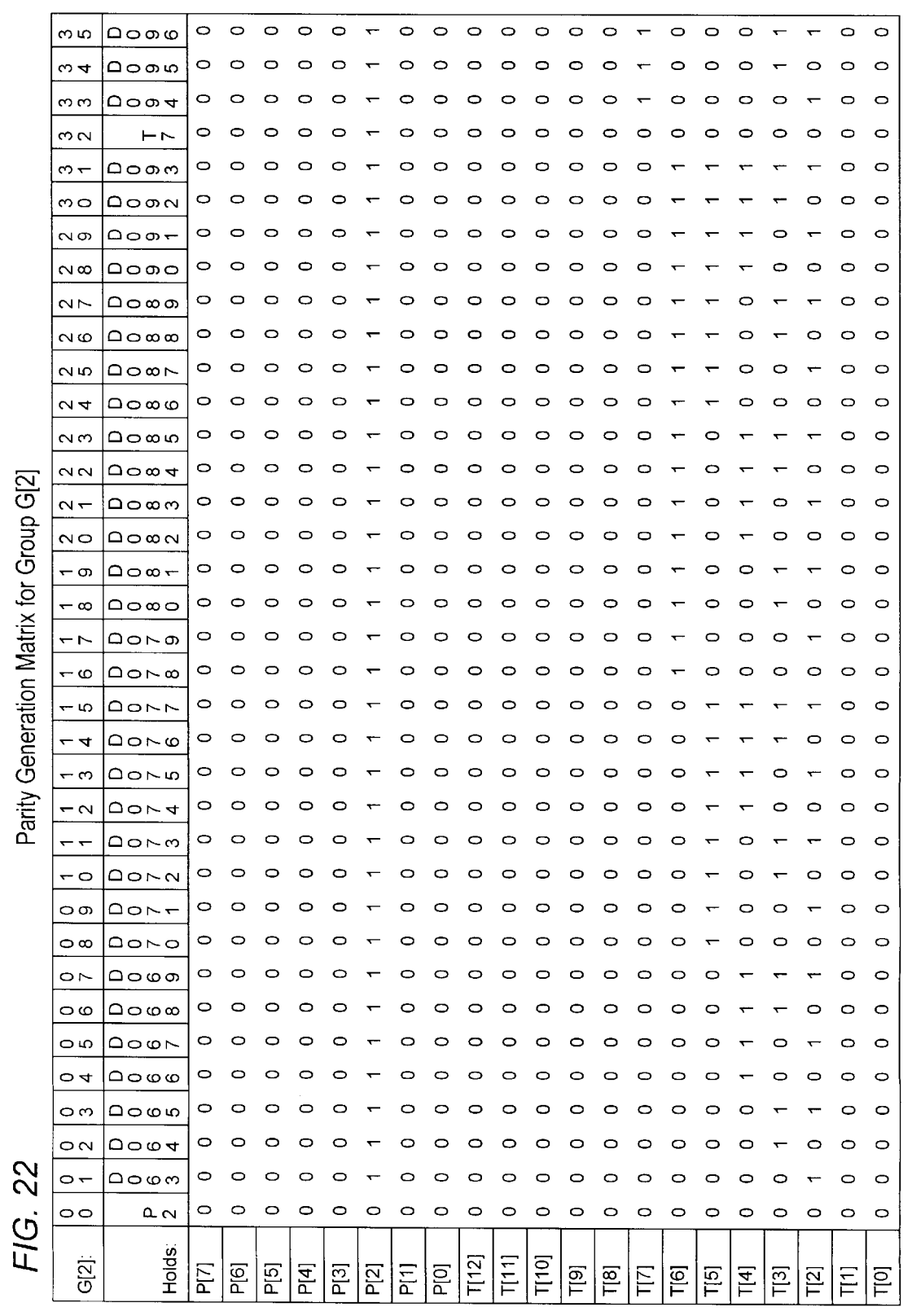
Figure 23:
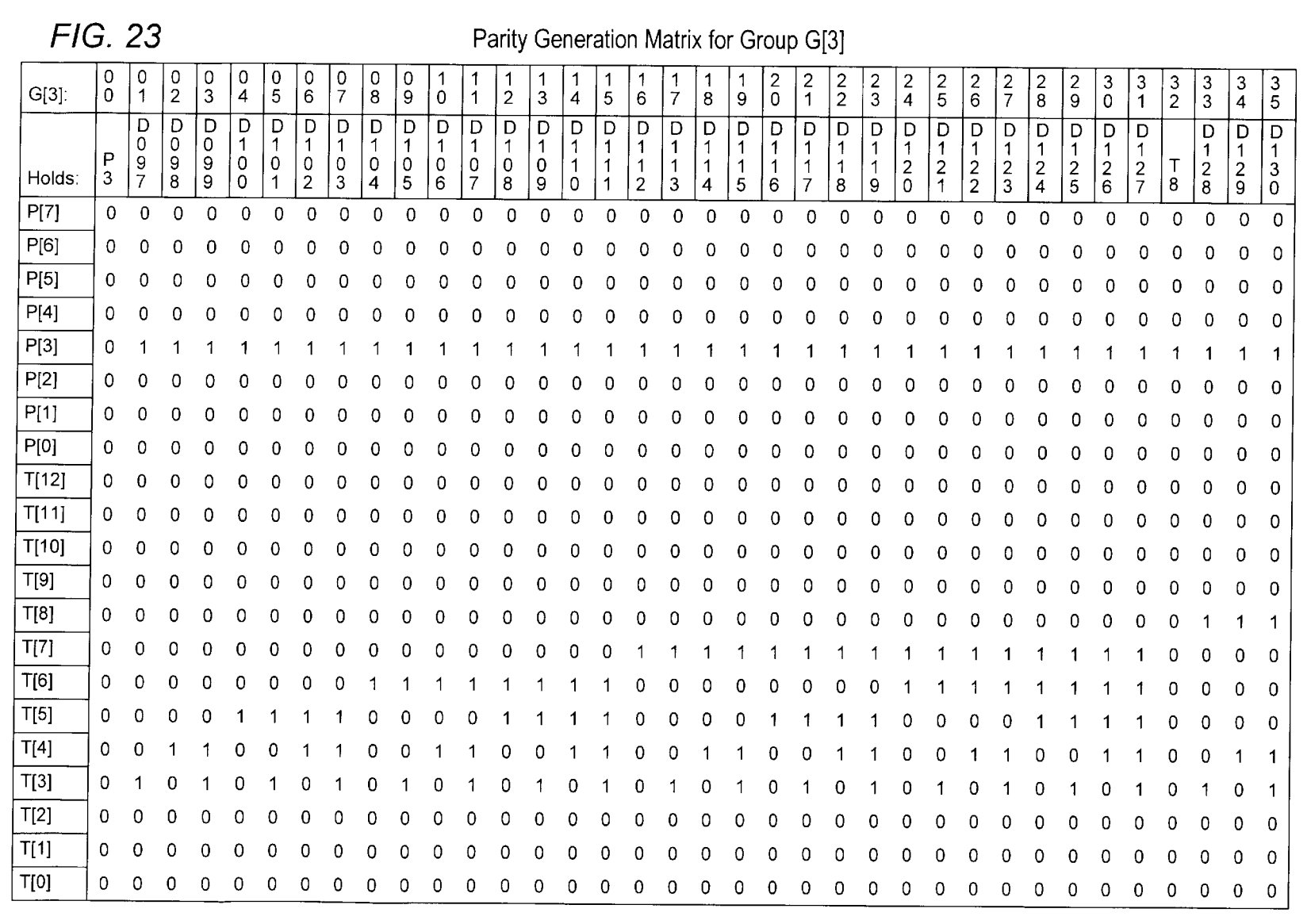
Figure 26:
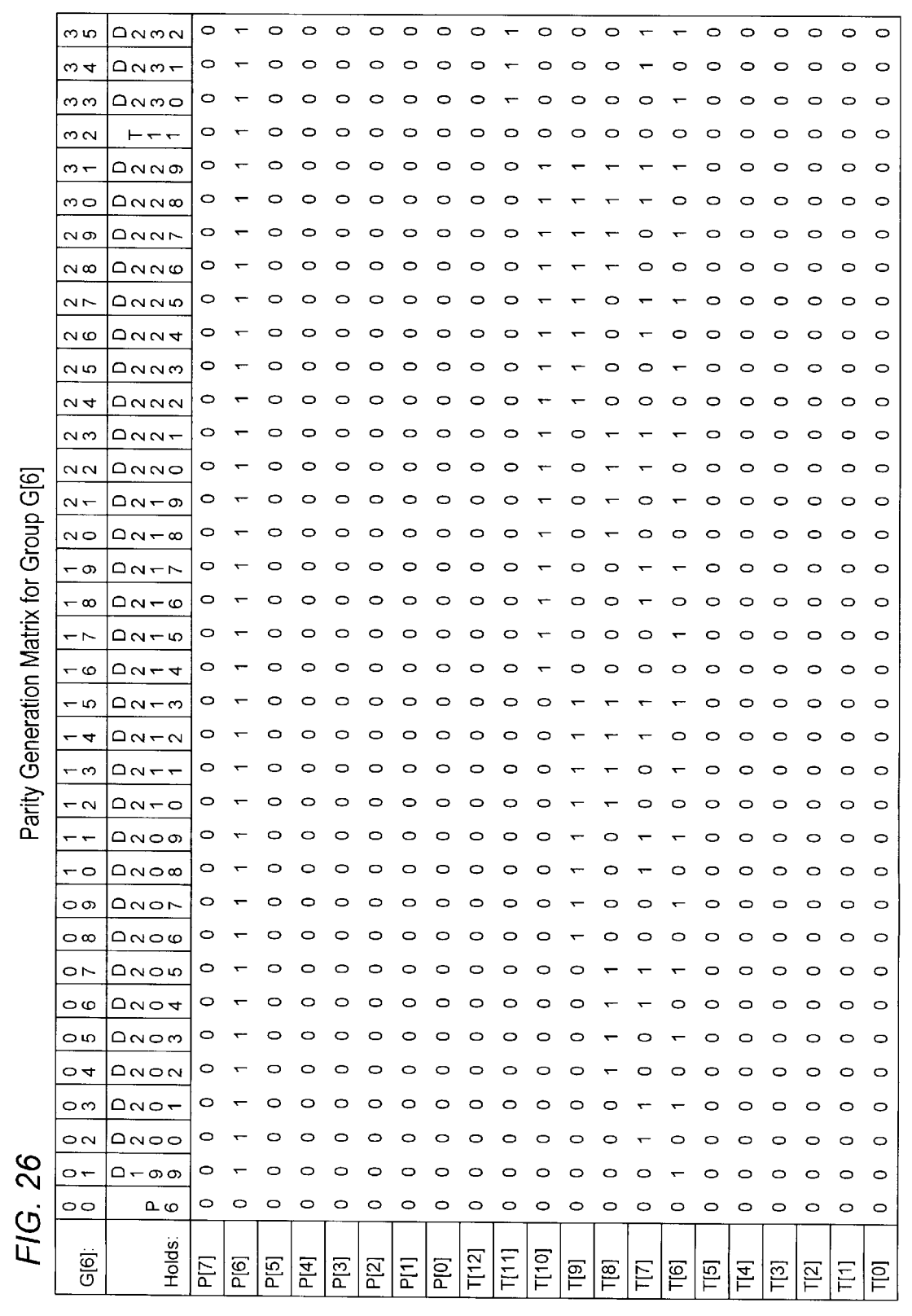
Figure 27:
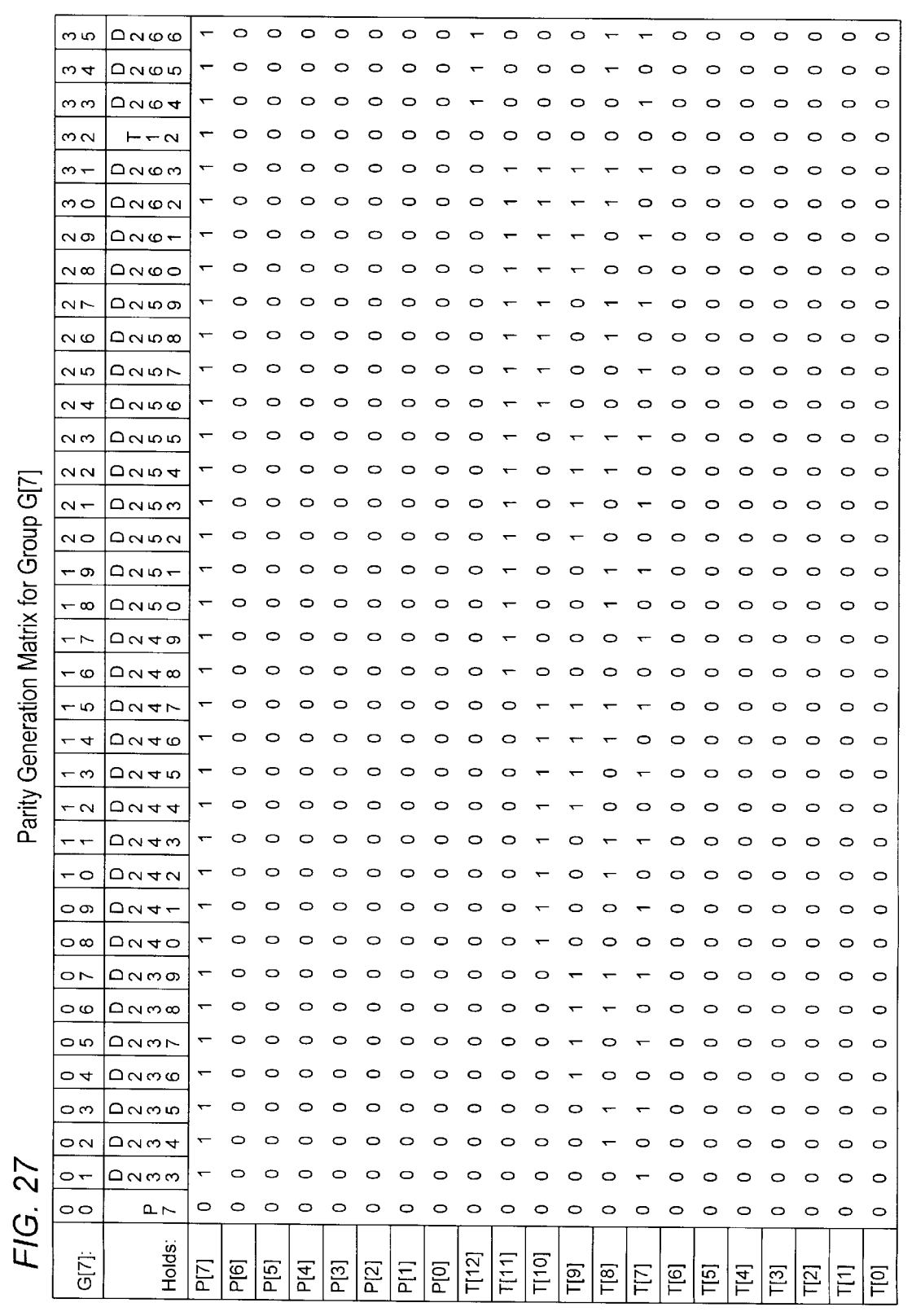

FIGS. 20–27 are assignment tables illustrating the operation of a set of check bits in accordance with another embodiment of the invention;

FIGS. 28–35 are assignment tables illustrating the generation of a set of row parity error bits and regenerated twisted check bits for the embodiment of FIGS. 20–27;

Figures 1, 2:
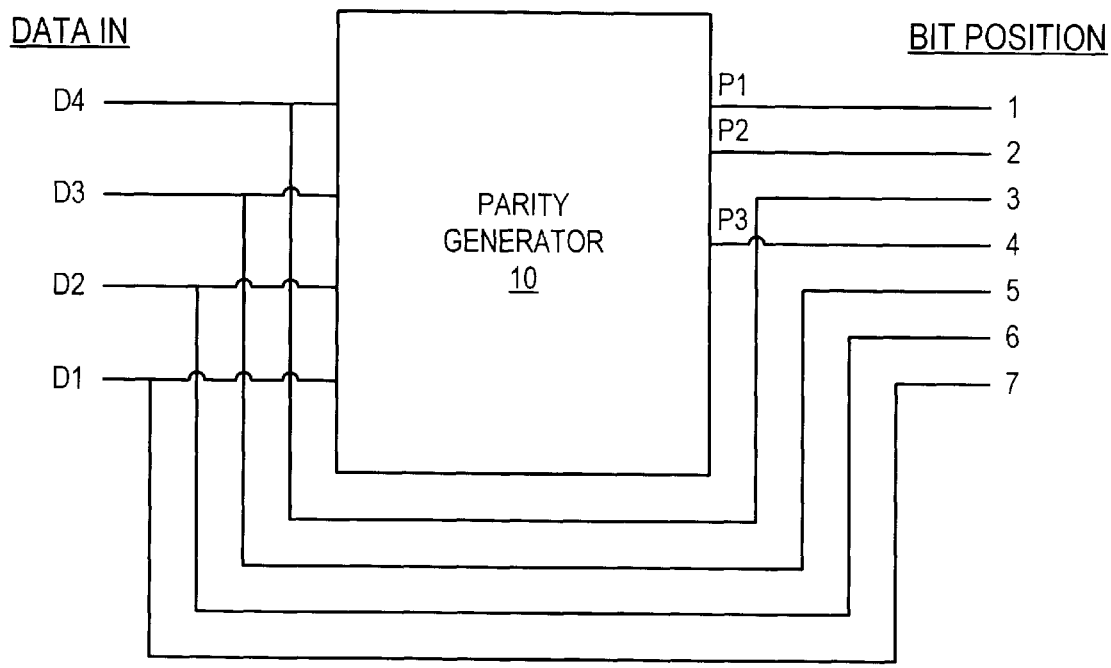
FIG. 1 (prior art) is a block diagram illustrating a parity generator to encode data bits using a single error correcting Hamming code.
FIG. 2 (prior art) is an assignment table to compute a set of check bits.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE DRAWINGS

Figure 5:
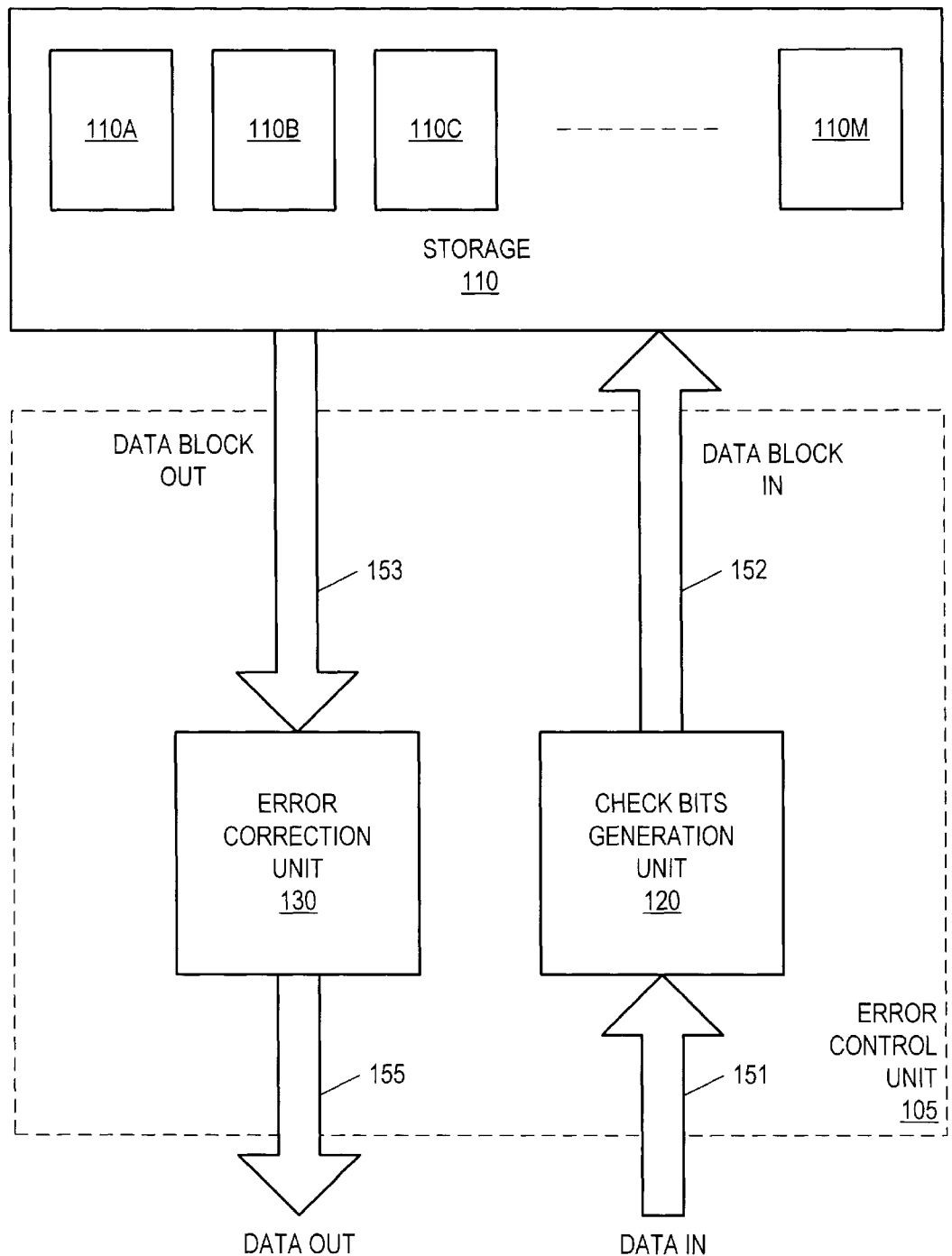
FIG. 5 is a block diagram of a system including an error control unit according to one embodiment of the present invention.

Turning now to FIG. 5, a block diagram of a system including an error control unit 105 is shown. In this particular embodiment, the error control unit 105 is coupled to convey and receive data from storage 110. The storage 110 is configured to store a data block (data bits and check bits) that is communicated from/to the error control unit 105. The storage 110 includes a plurality of memory chips 110A–110M. Each of the memory chips 110A–110M is configured to store a portion of the data block. The memory chips 110A–110M may be any type memory/ storage devices usable to store data.

As will be described in further detail below, error control unit 105 is configured to encode data to be stored in the storage 110, and to decode received encoded data following storage to correct certain categories of bit errors (when they occur) using a relatively small number of check bits as compared with traditional approaches, such as typical single error correcting Hamming codes.

The error control unit 105 includes a check bits generation unit 120 to perform the encoding process and an error correction unit 130 to perform the decoding process and to perform error correction. Data bits are received via data path 151 and are encoded by check bits generation unit 120 prior to storing a data block (data bits and check bits) into storage 110 via data path 152. Subsequently, the stored data block may be retrieved by error correction unit 130 via data path 153. Error correction unit 130 decodes the data block to detect and correct errors in the data. If one or more errors are detected, the errors are corrected. The data bits (corrected, if necessary) are then output via data path 155.

It is noted that check bits generation unit 120 and error correction unit 130 may be implemented in hardware, in software, or using a combination thereof. Various specific implementations are possible.

The operation of error control unit 105 will next be explained with reference to FIGS. 5–8. FIGS. 6A–8B illustrate an example wherein a total of 20 data bits to be stored in storage 110 are protected.

Figure 6A:
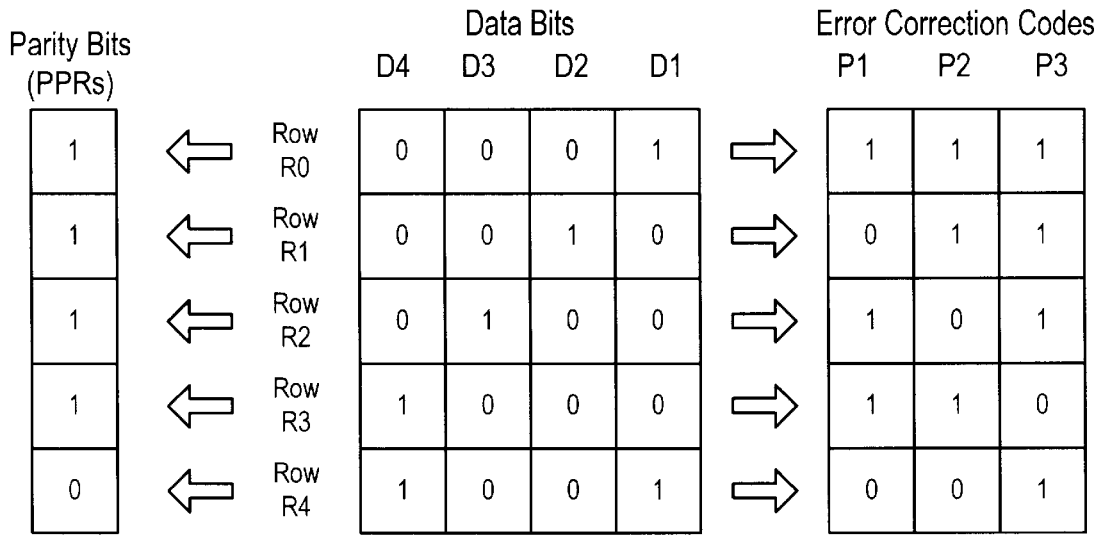
FIG. 6A illustrates an encoding process including the generation of row parity bits and row error correction codes.
Figure 6B:
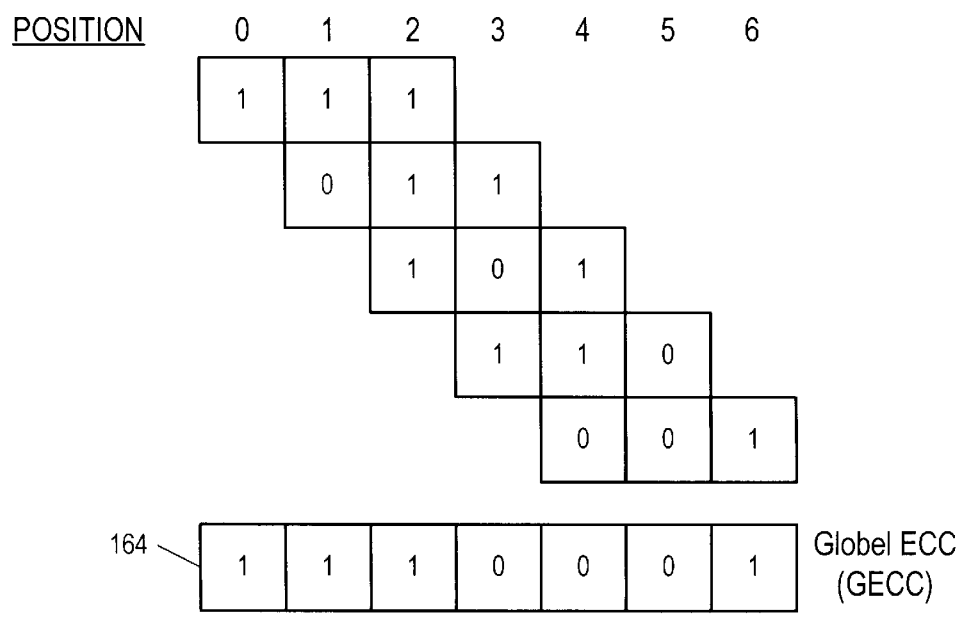
FIG. 6B illustrates a manner in which a global error correction code may be generated.

FIGS. 6A and 6B illustrate an encoding process performed by the check bits generation unit 120 prior to the storage of the data bits. Check bits generation unit 120 receives the 20 data bits (via data path 151) and, in this example, processes the data according to five logical groups, each group forming a respective row R0–R4, as shown in FIG. 6A. A set of columns denoted D4, D3, D2, and D1 is formed by corresponding bit positions of each row. As will be described in further detail below, the data forming each column is stored in the same memory chip, and different bits of each row are stored in different memory chips.

Check bits generation unit 120 is configured to generate a parity bit per row (PPR) and a global error correction code (GECC). The global error correction code is equivalent to, or may be derived from a predetermined logical combination of error correction codes each individually associated with a respective row. The PPR and GECC bits are check bits employed to protect the data bits against at most one error per row, provided that all errors occur in the same column.

The set of parity bits may be calculated using either even or odd parity. Since one parity bit is calculated per row, or logical group, the number of PPR bits equals the number of rows. In the example of FIG. 6A, even parity is used. Thus, for the exemplary data as illustrated, each of the parity bits (PPRs) for rows R0–R3 is 1. The parity bit for row R4 is 0.

FIG. 6A illustrates an error correction code (ECC) associated with each row. In the example of FIG. 6A, the error correction code for each row is calculated according to the assignment table shown in FIG. 2. For example, the error correction code calculated for the data in row R0 is [111], and the error correction code calculated for row R1 is [011], and so on. It is noted, however, that other specific error correction coding techniques may be employed, and that different error correction coding techniques may be associated with differing rows.

FIG. 6B illustrates a manner in which the global error correction code may be generated. More particularly, in this embodiment, the global error correction code may be generated by selectively shifting certain row ECCs with respect to one another and XORing the resulting vertically aligned bits. Since some of the row ECCs are shifted more than others, the bits forming the global error correction code are referred to as "twisted" check bits. In the embodiment of FIG. 6B, the global error correction code is derived by linearly shifting the error correction code for a given ith group by i bit positions wherein i=0 to X-1, and where X is the total number of rows or logical groups. The bits in each resulting vertically aligned column are then XORed together, to thereby generate the global error correction code (leading or trailing 0s may be added to the entries of each row of the twisted ECCs, as necessary, prior to this XOR operation).

It is noted that in the discussion above relating to FIGS. 6A and 6B, the global error correction code is calculated by first generating the individual error correction codes for each row and logically combining them in a predetermined manner. In other embodiments, the global error correction code may be generated directly from the data bits such that it is equivalent to the result of generating individual error correction codes for each row and combining them in a predetermined manner. For example, the global error correction code illustrated in FIG. 6B could be generated directly from the data bits using a predetermined function, without generating individual error correction codes for each row.

Upon calculation of the global error correction code, the data block including 20 bits of data, the parity bits (PPRs) and the global error correction code (GECC) are conveyed to storage 110. It is noted that the bits forming each column (D4, D3, D2, and D1) of data in the data block are stored in a common memory chip, and that no two data bits in differing bit positions of a particular row are stored in the same memory chip. It is further noted that the parity bits and global error correction code (GECC) may be stored in additional memory chips. A further example of the manner in which the parity bits and the bits forming the global error correction code (GECC) may be distributed for storage within various memory chips will be provided further below in conjunction with FIGS. 20–35.

It is further noted that in the example of FIGS. 6A and 6B, a total of 12 check bits (the parity bits (PPRs) and the bits of the global ECC) are generated for storage along with the 20 data bits. This overall number of check bits is advantageously less than the number of check bits required using conventional methods (wherein, for example, a total of 15 check bits, corresponding to the row error correction codes, are necessary). Generally speaking, in embodiments which employ a linearly shifted global error correction code generated according to the example of FIG. 6B, a total of only (2X+L−1) check bits are needed, where it is assumed that D bits of data are protected with C check bits using M memory chips (where M evenly divides (D+C)), and where X=(D+C)/M and C=X*L where L is the smallest integer such that $2^L > M$.

Referring now to FIGS. 7A–8B, the decoding process of the data block following storage will next be explained. As illustrated in FIG. 7A, error correction unit 130 processes the data according to the same logical groups as formed by check bits generation unit 120. Error correction unit 130 may be configured to generate a regenerated parity bit per row (PPR') using the received data. The same parity type (even or odd) is used during both encoding and decoding. In the example of FIG. 7A, two errors are introduced into the received data set, both occurring in column D2, as shown with underlines. More particularly, the bits in rows R1 and R3 of column D2 have been changed to exemplify errors. Such errors could be the result of, for example, a faulty memory chip that stores the column D2 bits of the data set. Thus, for this example, the regenerated parity bits for rows R1 and R3 change state. A bit for each row indicating that a parity error exists may be generated by XORing the original parity bits with the regenerated parity bits. It is noted that generation of these row parity error bits (RPEs) may instead be generated directly by XORing corresponding bits of the received data bits with the original parity bits (PPRs) (without separately generating the regenerated parity bits (PPRs)).

If any of the rows have a single bit error, as indicated by the row parity error bits (RPEs), the error correction unit 130 generates a regenerated global error correction code in the same manner in which the original global error correction code was generated, using the regenerated error correction codes. Thus, in one embodiment, the regenerated global error correction code may be derived by shifting the error correction code for a given ith group by i bit positions, where i=0–X−1, and by XORing the bits in the resulting vertically aligned columns, as depicted in FIG. 7B. Similar to the previous discussion, in other embodiments, the regenerated global error correction code may be derived directly from a predetermined function of the received data bits, without generating an individual error correction code for each row. In such embodiments, however, the global error correction code is equivalent to a predetermined combination of a set of error correction codes each individually associated with a corresponding row.

Figure 8A:
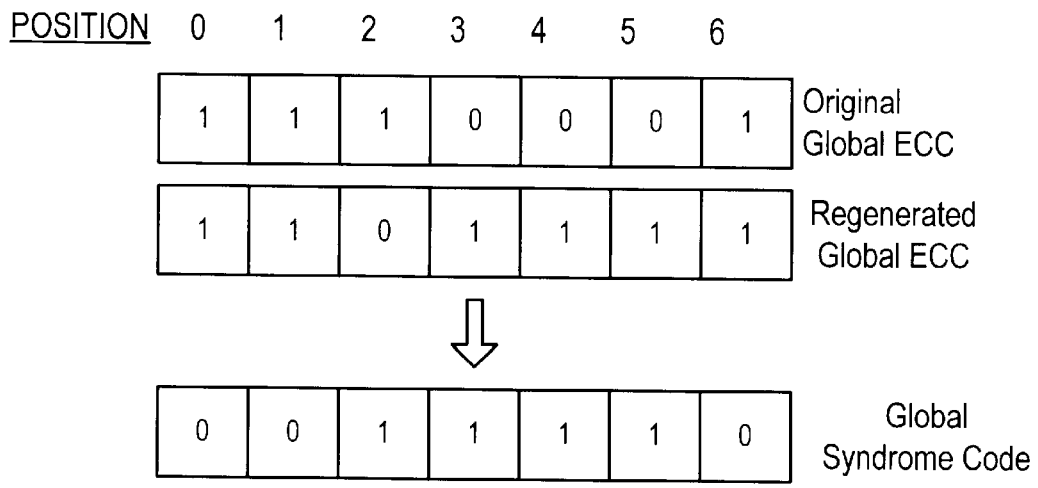
FIG. 8A illustrates a manner in which a global syndrome code may be generated.

As shown in FIG. 8A, upon generation of the regenerated global error correction code, a global syndrome code may be generated by XORing the original global error correction code with the regenerated global error correction code. This global syndrome code is indicative of a difference between the original global error correction code and the regenerated global error correction code. In embodiments in which the error correction codes for various logical groups are effectively shifted in a twisted manner and are XORed, the global syndrome code includes a bit corresponding to each aligned column of the regenerated shifted error correction codes which indicates whether a parity error for that column exists. For instance, in the example of FIG. 8, the bits in the global syndrome code for positions 2, 3, 4 and 5 are set. This is the result of the fact that the parity in each of columns 2, 3, 4 and 5 of the shifted regenerated error correction codes of FIG. 7B is different from the parity of each of the corresponding columns of the original shifted error correction codes, as depicted in FIG. 6B. Accordingly, in this embodiment the global syndrome code includes a bit corresponding to each aligned column of the regenerated shifted error correction codes which indicates whether a parity error for that column exists. Since the regenerated error correction codes for the logical groups that have errors will incur changes at exactly the same bit positions, by shifting in a twisted manner the various error correction codes and XORing the resulting bit aligned columns, the correlation that exists with respect to changes in the error correction codes for logical groups that have errors may be exploited to thereby extract information indicating the specific positions of the errors.

Figure 8B:
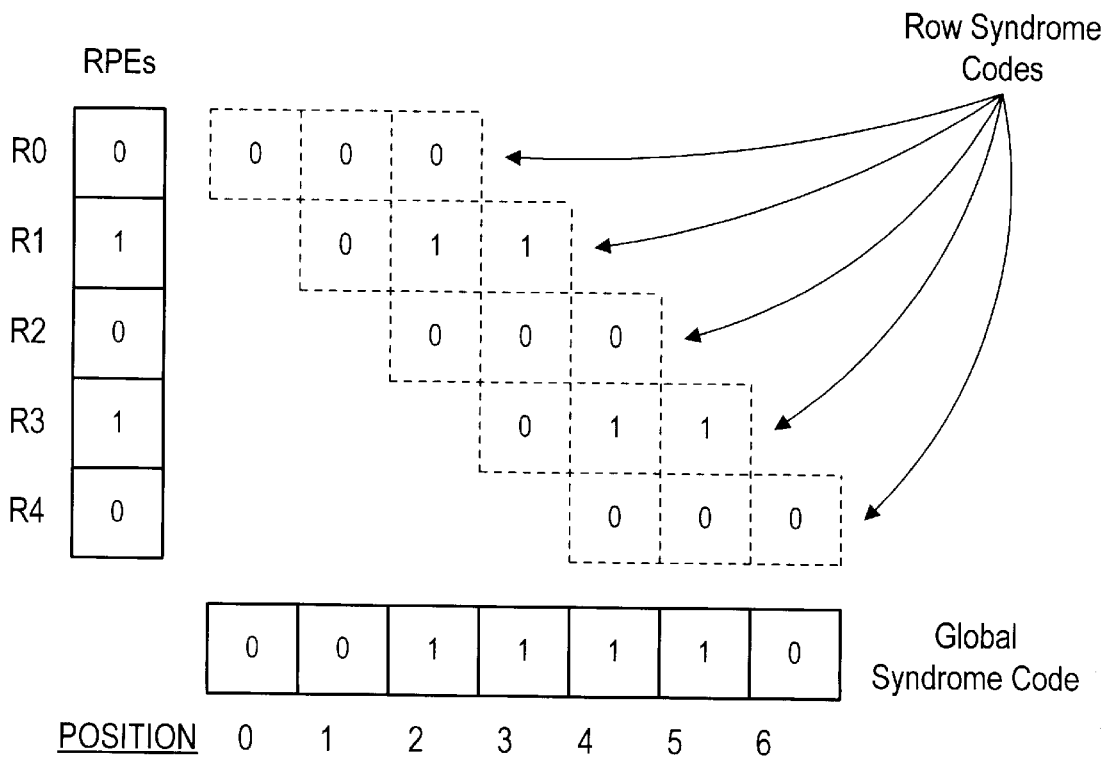
FIG. 8B illustrates a manner in which a set of row syndrome codes may be generated.

For example, FIG. 8B illustrates a manner in which a set of row syndrome codes, each of which is indicative of the position of an error in a given row, may be generated using the global syndrome code and the row parity error information. As illustrated in FIG. 8B, entries (initially unfilled) for each row syndrome code are provided by shifting the entries in the same manner in which the error correction codes were shifted to generate the global error correction code. First, the row syndrome codes for any rows that do not have errors can be filled in with all "0" values (since rows without errors could not contribute to a parity error in any given column, as identified by the global syndrome code). Thus, the row syndrome code entries for rows R0, R2, and R4 can be filled in with all "0" values. As depicted in FIG. 8B, the first row with an error is row R1. Since the first bit of the row syndrome code for row R1 is in column position 1, and since the global syndrome value for that bit position is 0 and the only other contributing value for that bit position of the global syndrome code is derived from the row syndrome code for row R0 (which is already known to be "0"), the value of the first bit of the row syndrome code for row R1 can be filled in as "0". Additionally, since the row syndrome code for every row with an error is known to be identical, the first bit of the row syndrome code for row R3 can also be filled in as a "0". Subsequently, the second bit of the syndrome code for row R1 may be similarly determined by considering the value in bit position 2 of the global syndrome, and the values of the bits in position 2 of rows 0 and 2 (i.e., the last bit of the row syndrome code for row R0 and the first bit of the row syndrome code for row R2). In this situation, the value of the second bit of the row syndrome code for row R1 may be filled in as a "1". Again, this value is also reflected in the second bit of the row syndrome code for row R3. The last bit of the row syndrome codes may be determined similarly.

The binary value of the row syndrome codes (taken in reverse order with respect to the depicted values in FIG. 8B) thus indicates the position of the error for logical groups that have errors. Therefore, in this example, the value "110", which is binary 6, correlates to bit position D2, as shown in FIG. 3. This position corresponds to the position of the errors introduced in the example shown in FIG. 7A.

Upon determination of the erroneous bits in the received data set, the error correction unit 230 is configured to correct the data, as needed. For example, in the example of FIGS. 6–8, the bits in column D2 of the rows R1 and R3 are identified as being erroneous. Accordingly, error correction unit 230 inverts these bits and outputs the data as corrected via data output 155.

Figure 9:
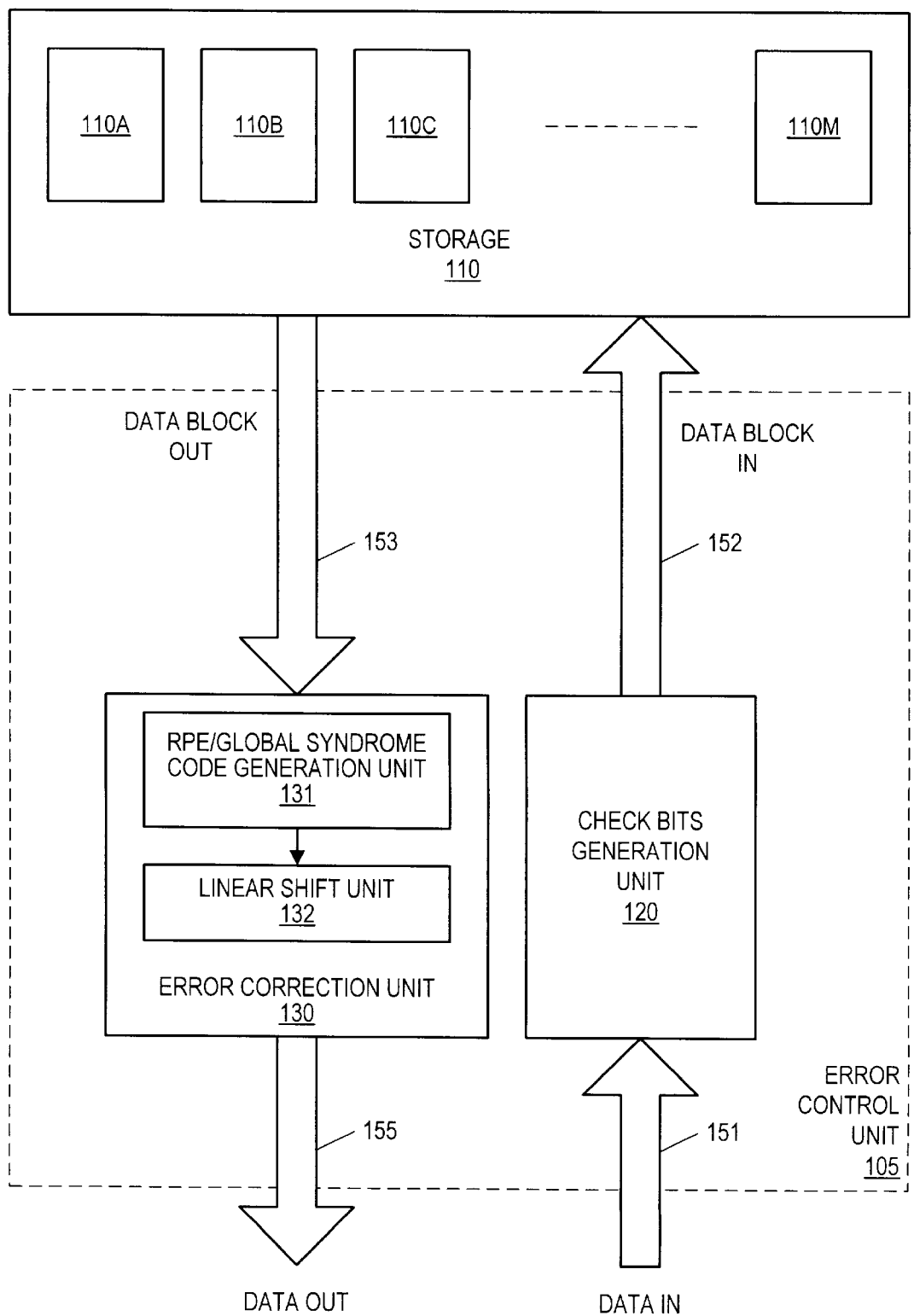
FIG. 9 is a block diagram of a system including a linear shift unit for decoding a data block.
Figure 10:
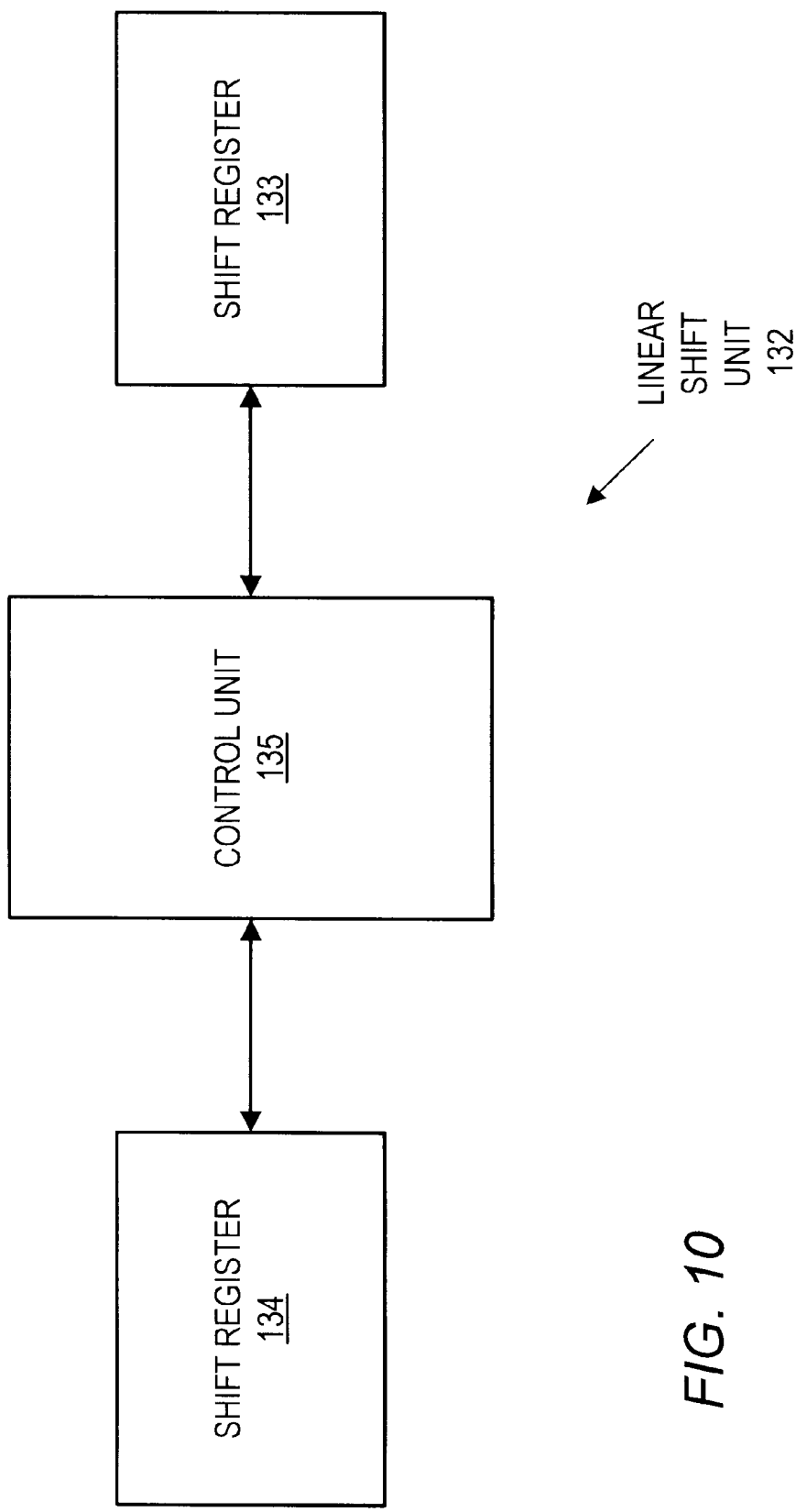
FIG. 10 is a functional block diagram of a linear shift unit.

Turning next to FIGS. 9–17, a manner in which the row parity information and the global syndrome information may be decoded to generate the row syndrome code is next considered. More particularly, as illustrated in FIG. 9, error correction unit 130 may employ an RPE/global syndrome code generation unit 131 and a linear shift unit 132 for decoding a received data block which is encoded using the linear shifting methodology as described above. A functional block diagram illustrating functional aspects of the linear shift unit 132 is illustrated in FIG. 10. As shown, linear shift unit 132 includes a control unit 135 coupled to a pair of shift registers 133 and 134. The various functionality illustrated in FIGS. 9 and 10 may be implemented in hardware, in software, or using a combination thereof.

The RPE/global syndrome code generation unit 131 generates the row parity error bits (RPEs) and the global syndrome code in accordance with the foregoing description using the received data block. The row parity error bits (RPEs) and the global syndrome code are then provided to the linear shift unit 132.

Figure 11:
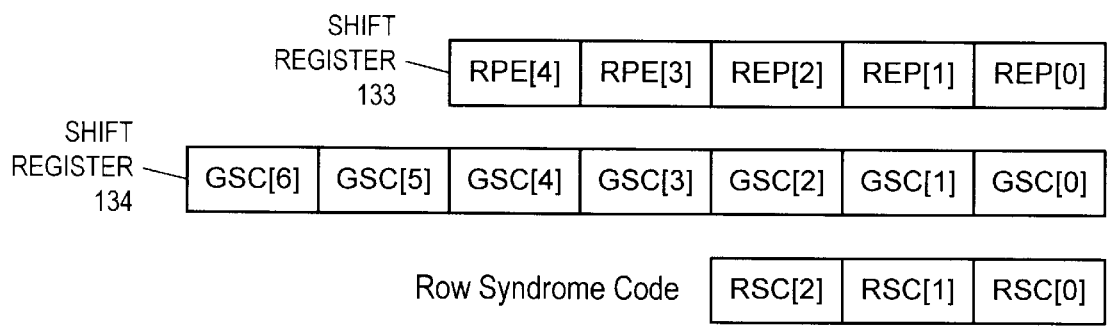
FIGS. 11–17 illustrate an exemplary generation of a row syndrome code.
Figure 12:
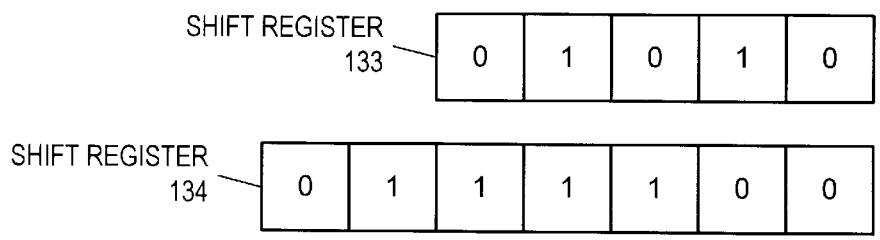
Figure 16:
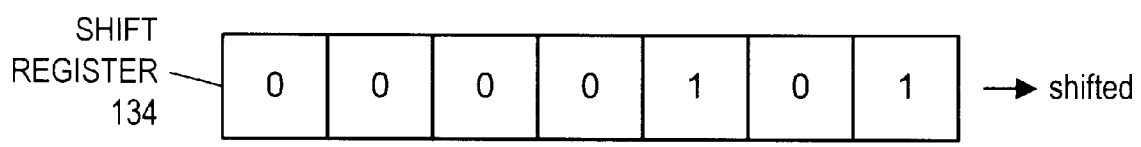
Figure 17:
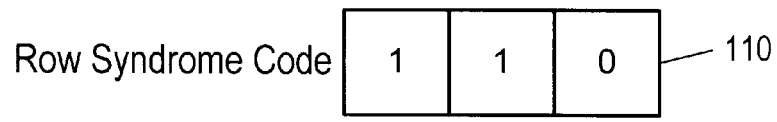
Figure 18:
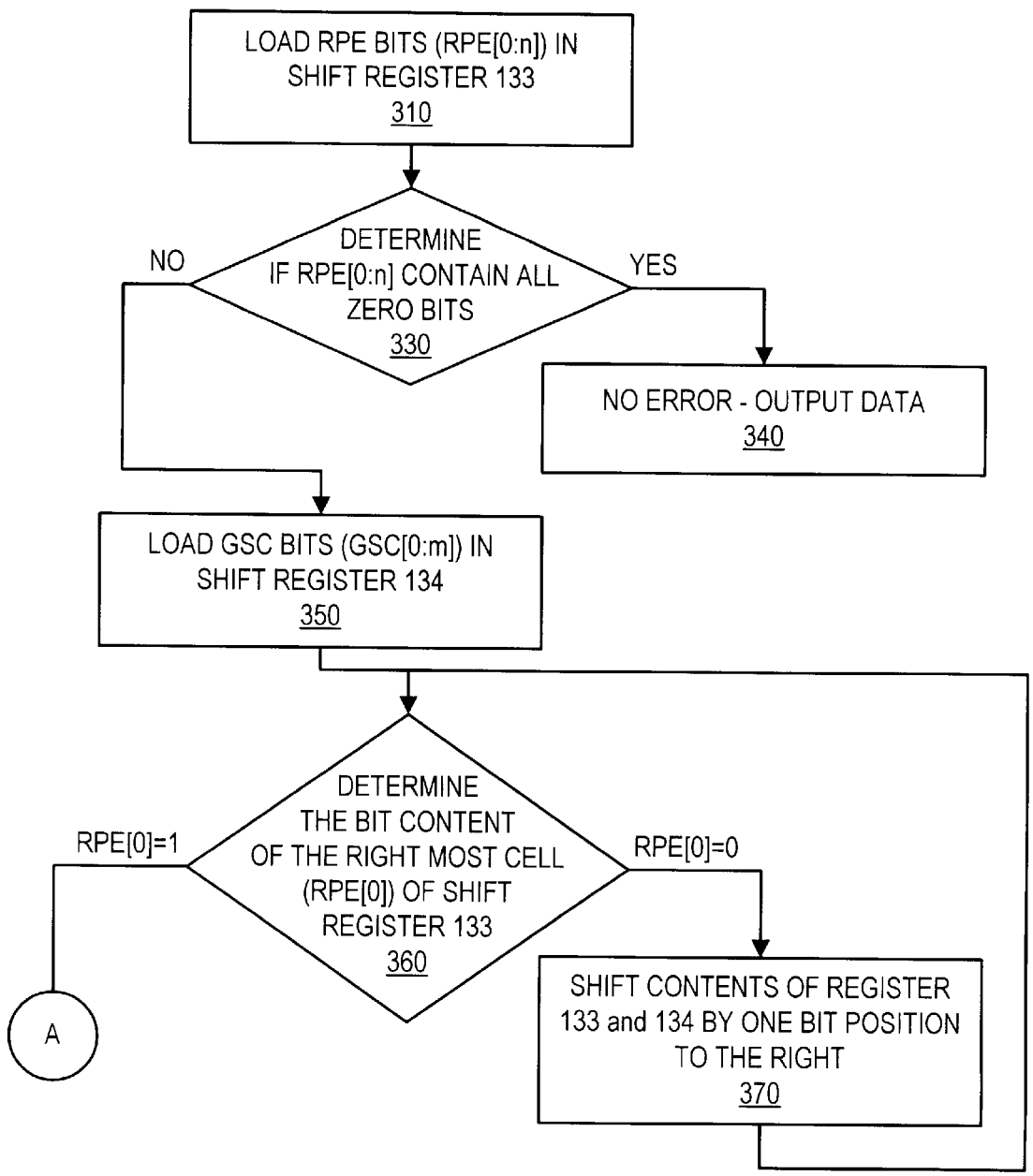
FIGS. 18 and 19 illustrate a flow diagram illustrating one embodiment of a linear decode process.
Figure 19:
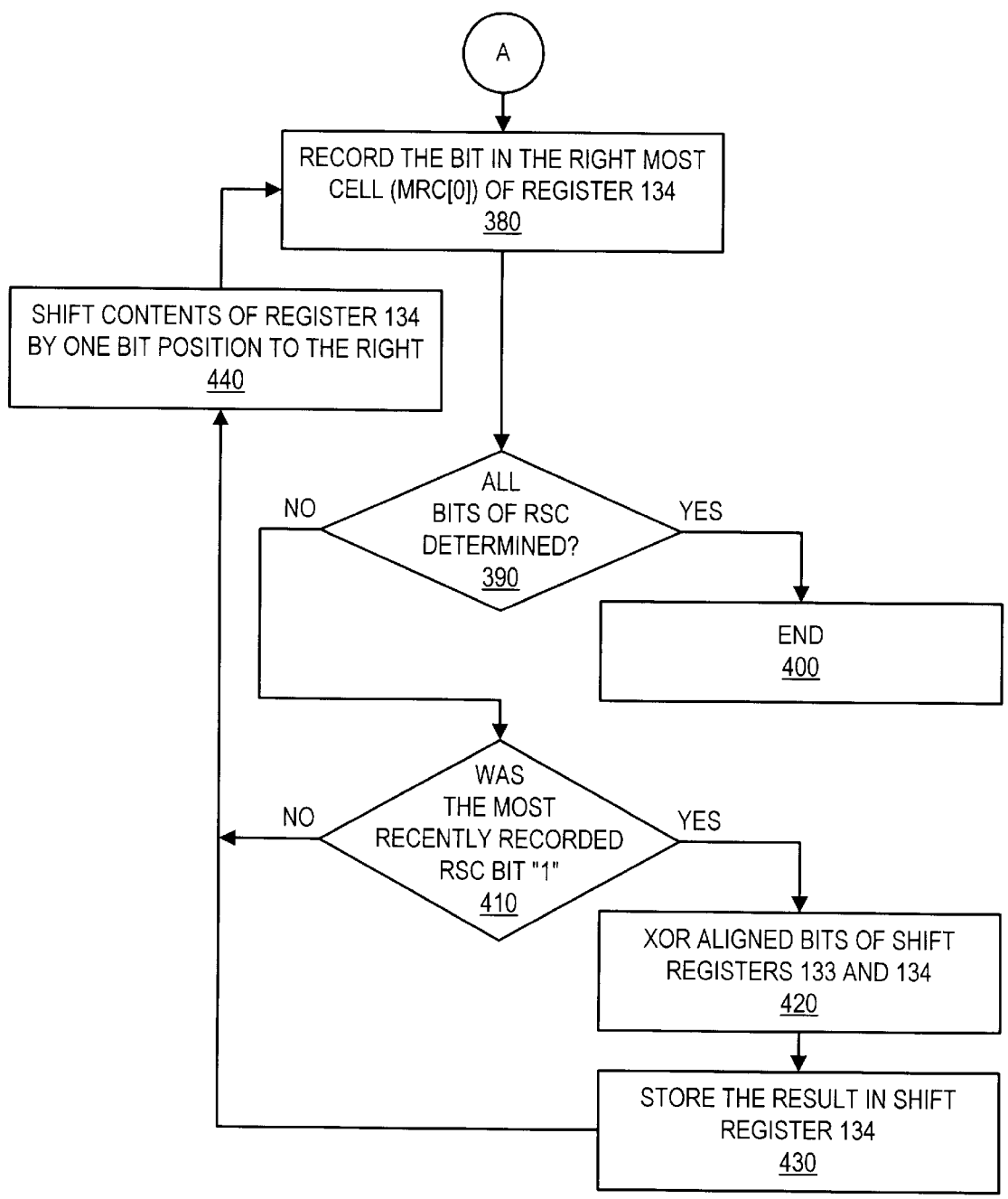

The operation of the linear shift unit 132 is explained with reference to FIGS. 11–17, along with the flow diagrams of FIGS. 18–19. As illustrated in FIG. 11, shift register 133 includes a plurality of cells RPE[0:4] for storing the row parity error bits (RPEs) for rows 0–4, respectively. Similarly, shift register 134 includes a plurality of cells GSC[0:6] for storing the global syndrome code. Referring collectively to FIGS. 11 and 18, initially, the row parity error bits RPEs are loaded into shift register 133, and control unit 135 determines whether the shift register contains all "0"s (steps 310 and 330). If shift register 133 contains all 0s, thus indicating that no single bit row errors exist, no data error is reported, and the data is output from the error control unit (step 340). On the other hand, if one or more row parity error bits are set, the global syndrome code is loaded into shift register 134 (step 350). FIG. 12 illustrates the contents of shift registers 133 and 134 at this point in the methodology for the exemplary RPEs and global syndrome code generated for the example associated with FIG. 8B.

Figure 13:
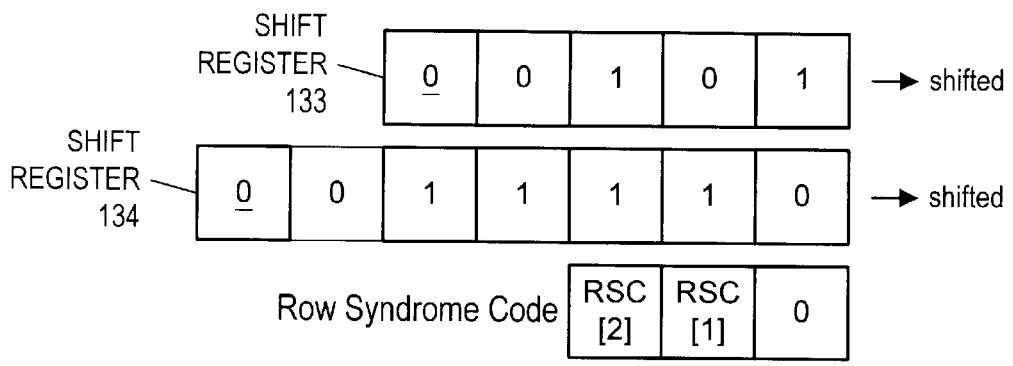

The content of the right-most cell of shift register 133 (cell RPE[0]) is then determined during step 360. If the value in the right-most cell RPE[0] of the shift register 133 is "0", the contents of both the shift register 133 and the shift register 134 are shifted one bit position to the right (step 370). The left-most parity in each of these registers is padded with a "0", and the values which are shifted from the right-most positions are discarded. This process repeats until the value in the right-most cell RPE[0] of register 133 is a "1". FIG. 13 illustrates the resulting values in shift registers 133 and 134 following this operation for the exemplary codes.

Figure 14:
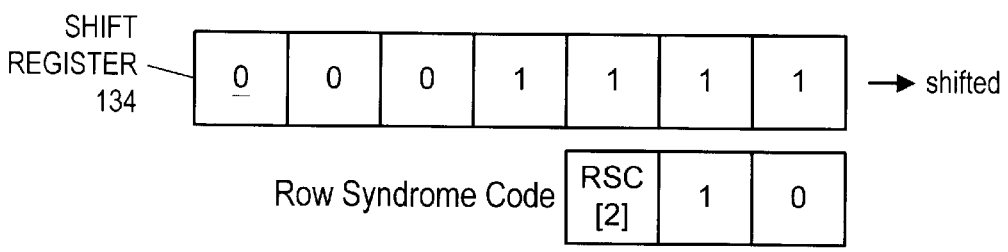

At this point, the bit value in the right-most cell of the register 134 is recorded as row syndrome code bit RSC[0], as is also shown in FIG. 13 (step 380). If all the row syndrome code bits have not yet been determined (step 390), a determination is made as to whether the last recorded row syndrome code bit was 1. If not, the contents of shift register 134 are again shifted by one position to the right (step 440), and the process repeats. On the other hand, if the last row syndrome code bit recorded was 1, aligned bit positions of the first and second shift registers are XORed and the result is stored in the second shift register 134 (steps 420 and 430). In the illustrated example, the most recently recorded row syndrome code bit was "0", and thus the contents of the second shift register 134 are shifted by one position to the right (step 440), and the process repeats by recording the value in the right-most position of register 134 as the next RSC bit, as illustrated in FIG. 14.

Figure 15:
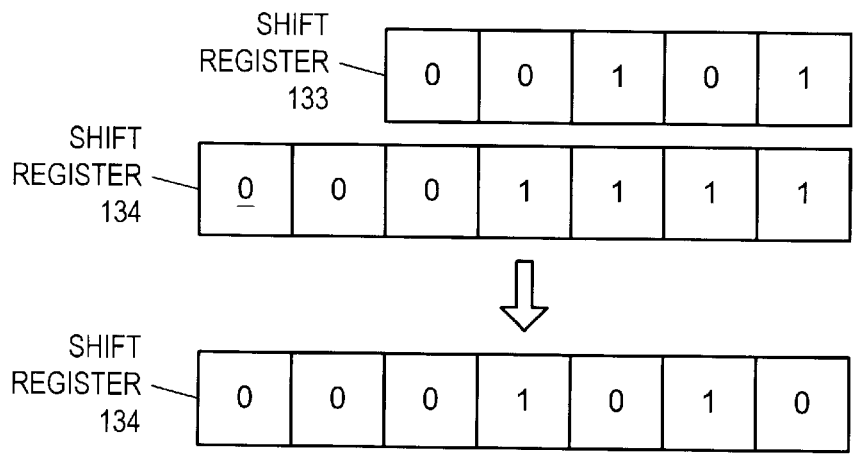

During the next iteration, since the last recorded RSC bit was "1", the value in shift register 133 is XORed with the value in shift register 134 (step 420) and the result is stored in shift register 134, as illustrated in FIG. 15. The contents of register 134 are again shifted by one position to the right as illustrated in FIG. 16 (step 440) and the resulting bit in the right-most position of shift register 134 is recorded as the next RSC bit, as illustrated in FIG. 17 (step 380). When all bits of the row syndrome code have been determined, the process ends (step 400).

The row syndrome code is indicative of the position of the error for any rows with a single bit error. In the illustrated example, the binary value of the row syndrome code is 6. Referring to FIG. 3, bit position 6 corresponds to column D2, which is the position of the errors introduced in the example of FIG. 7A.

It is noted that alternative embodiments of the linear shift decode methodology described in conjunction with FIGS. 9–19 are possible. For example, rather than right shifting the values in shift registers 133 and 134, the values may be left shifted in a similar manner to derive the row syndrome code.

FIGS. 20–35 are tables which illustrate another embodiment of a system which employs the linearly shifted technique for global syndrome code generation as described above. In the embodiment depicted by FIGS. 20–35, 267 bits of data are protected with 21 check bits. The code is defined in terms of 288-bit blocks. The data bits within a block are denoted D[266:0]. The 21 check bits within a block consist of 8 parity bits P[7:0] and a global syndrome code consisting of 13 twisted check bits T[12:0].

The 288-bit block is divided into eight groups, denoted G[0] through G[7], each of which contains 36 bits. This code can correct one error per group G[0] through G[7], provided that all of the errors occur in the same position within each group.

The parity bits P[7:0] and twisted check bits T[12:0] are calculated according to the tables of FIGS. 20–27. Each table lists the 36 bit positions within the group and the contents of each bit position. For example, G[0][0] contains P[0], G[0][29] contains D[23], and G[1][32] contains T[6], and so on. The remaining rows in each table give the rules for calculating the check bits. Each check bit is the exclusive-or of certain values. More particularly, the values which contribute to a particular check bit are indicated using a "1" at the appropriate positions in the tables. For example, parity bit P[0] is the exclusive-or of G[0][35:1]. Since the parity bits P[7:0] depend upon certain ones of the twisted check bits T[12:0], the twisted check bits T[12:0] can be calculated first, and subsequently the parity bits P[7:0].

It is noted that in this example, there are total of 36 entries in each group. Accordingly, the system may be constructed such that a total of 36 memory chips are used, each storing a bit from a corresponding position of each group.

When the data are received, parity error bits Q[7:0] and regenerated twisted check bits V[12:0] (the regenerated global ECC) are calculated by taking the exclusive-or of the received values, in accordance with the assignment tables of FIGS. 28–35. In addition, a global parity error bit Q may be calculated taking the exclusive-or of Q[7:0].

Figure 36:
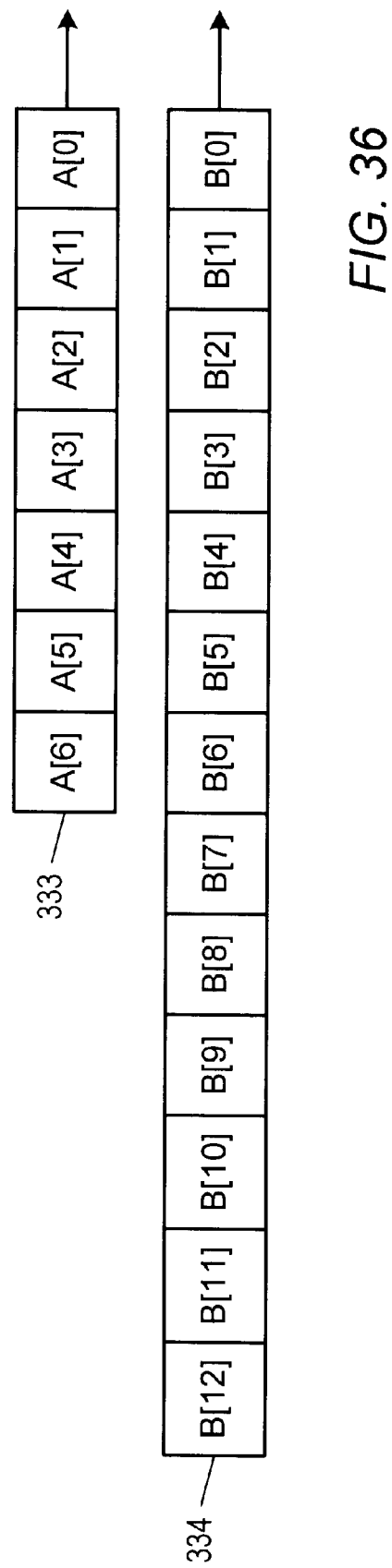
FIG. 36 illustrates a linear decode process.

In certain cases, it is necessary to generate an untwisted syndrome U[5:0] (i.e., the row or group syndrome code). This untwisted syndrome is a function of V[12:0] and Q[6:0]. As illustrated in FIG. 36 and like the previous example, the untwisted syndrome U[5:0] can be calculated using parallel shift registers, 333 and 334, which are similar to the registers 133 and 134 illustrated in FIG. 10.

Shift register 333 contains 7 cells, A[6:0], and shift register 334 contains 13 cells, B[12:0]. Each cell holds a single bit. The shift registers 333 and 334 are separately controlled. When a shift register is made to shift, it transfers the contents of each cell one position to the right, outputs the value that was in its right-most cell, and loads a "0" into its left-most cell. Similar to the previous description, it is also possible to calculate the XOR of shift register 333 and shift register 334 and store the contents into shift register 334 (shift register 333 is logically padded with 0s in positions 12:7 when the XOR is computed).

The untwisted syndrome U[5:0] is calculated as follows:
1. Load Q[i] in cell A[i], $0 \leq i \leq 6$, and load V[i] in cell B[i], $0 \leq i \leq 12$.
2. While A[0] contains 0:
   a. Shift both shift register 333 and shift register 334 right one position, discarding the values shifted out.
3. For i=0 through 5:
   a. Set U[i]=B[0].
   b. If B[0]=1, calculate the XOR of shift register 333 and shift register 334 and place the result in shift register 334 (that is, B[j]=A[j]XOR B[j], $0 \leq j \leq 6$).
   c. Shift shift register 334 right one position, discarding the value shifted out.

Given Q, Q[7:0], and U[5:0], errors are corrected as follows. The description of what type of error has occurred assumes that the errors are within the considered type (namely 0 to 8 errors, all in the same position within their group).
1. If Q=0:
   a. If Q[7:0]=00000000, no error has occurred.
   b. If Q[7:0]≠00000000, a correctable error has occurred. Complement the bits in all locations of the form G[i][j], $0 \leq i \leq 7, 0 \leq j \leq 35$, where Q[i]=1 and j=U[5:0] (viewed as a binary number). (If U[5:0]>35, an uncorrectable error not in the class of considered errors has occurred).
2. If Q=1: A correctable error has occurred. Complement the bits in all locations of the form G[i][j], $0 \leq i \leq 7$, $0 \leq j \leq 35$, where Q[i]=1 and j=U[5:0] (viewed as a binary number). (If U[5:0]>35, an uncorrectable error not in the class of considered errors has occurred).

It is noted that no error has occurred if Q[7:0]=00000000. It is also noted that U[5:0] only needs to be calculated in cases 1.b and 2 (which indicates a correctable error has occurred).

In the embodiment illustrated by FIGS. 20–35, the global error correction code formed by twisted check bits T[12:0] are generated directly from a predetermined combination of the data bits. Each twisted check bit T[12:0] is stored at a position within each group such that it is the only check bit that covers that position. For example, as illustrated in FIG. 28, the twisted check bit T0 is stored at position G[0][01], and is the only check bit which contributes to the regenerated twisted check bit V[0], and so. In addition, it is noted that the parity bits P[7:0] for each data group include certain twisted check bits stored within that group. Since the parity bits are stored within position [00] of the various groups, further efficiency may be attained.

Still additional embodiments may also be possible wherein a global syndrome code is generated using other methods. In such embodiments, the stored or transmitted global error correction code is dependent upon or equivalent to a logical combination of a set of error correction codes associated with the logical groups of the original data, while the regenerated global error correction code is dependent upon or equivalent to a logical combination of a set of error correction codes associated with the logical groups of the received or retrieved data bits. The global syndrome code is generated such that, with knowledge of the specific logical groups that have a single bit error, a value indicative of the location of the error in such groups may be derived from the syndrome code. The overall number of bits forming the global syndrome code and the parity bits for each logical group is smaller than the overall number of bits needed for the error correction codes individually associated with the logical groups.

Figure 37:
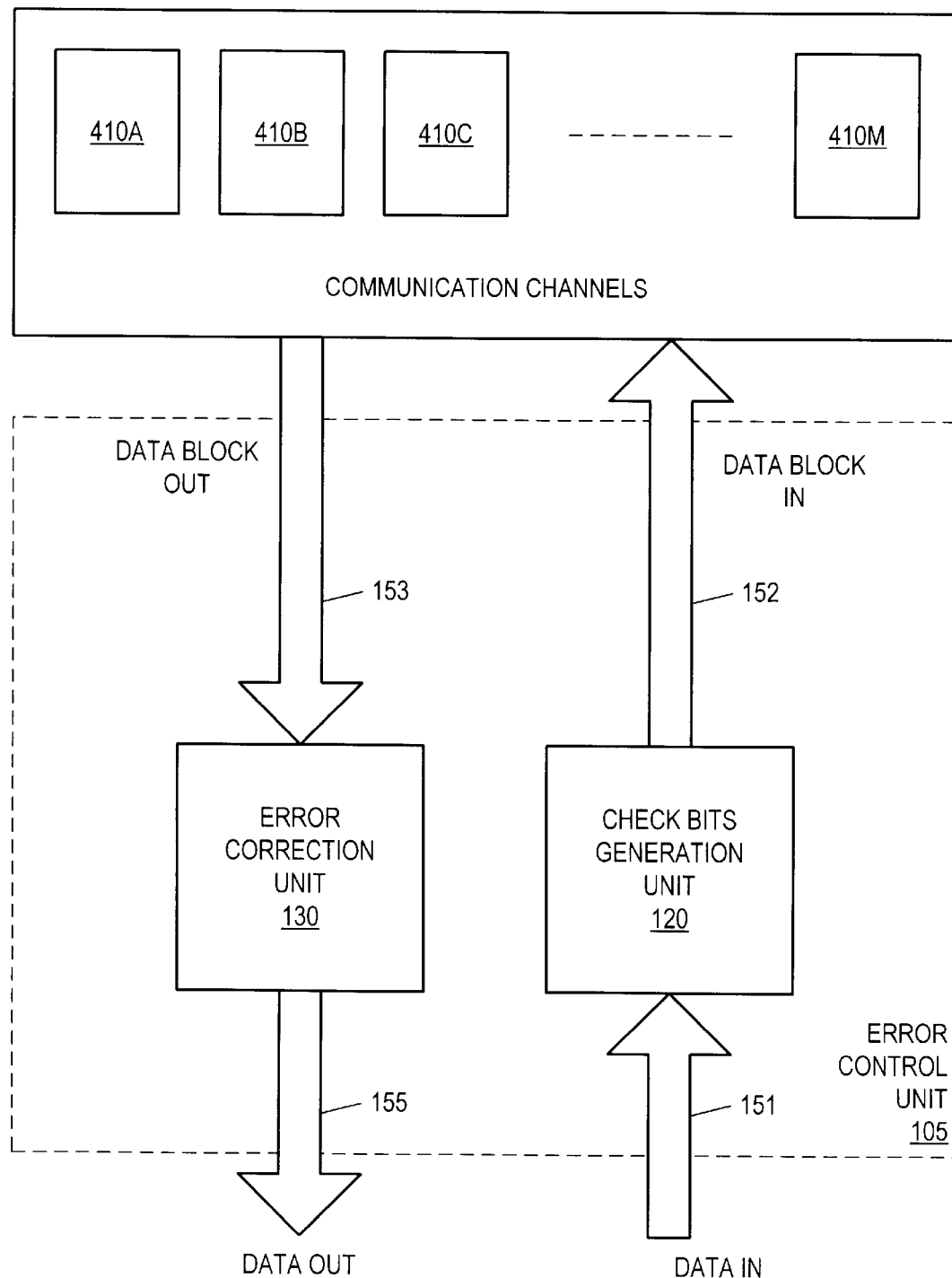
FIG. 37 is a block diagram of a system in accordance with another embodiment of the present invention.

Finally, FIG. 37 illustrates an embodiment wherein a data block protected in accordance with the foregoing techniques is conveyed through a plurality of communication channels 410 . . . 410M. Each communication channel 410A–410M is illustrative of, for example, a wire or other transmission medium. Similar to the previous embodiments, different bits in each logical group are conveyed through different communication channels.

While the present invention has been described with reference to particular embodiments, it will be understood that the embodiments are illustrative and that the invention scope is not so limited. Any variations, modifications, additions and improvements to the embodiments described are possible. These variations, modifications, additions and improvements may fall within the scope of the invention as detailed within the following claims.

What is claimed is:
1. An apparatus for decoding a global error correction code corresponding to a plurality of data bits, wherein said global error correction code is equivalent to a predetermined combination of a set of error correction codes each individually associated with a corresponding one of said plurality of data groupings, and wherein global error correction code is expressed using a smaller number of bits than a total number of bits of said set of error correction codes, the apparatus comprising:
   a global syndrome code generation unit configured to generate a global syndrome code representing a difference between the global error correction code and a regenerated global error correction code, wherein the regenerated global error correction code is regenerated using a plurality of received data bits;
   a first shift register configured to receive a set of parity error bits each indicative of a parity error within a respective group of said received data bits;
   a second shift register configured to receive said global syndrome code; and
   a control unit coupled to said first and second shift registers, wherein said control unit is configured to selectively shift and combine said set of parity error bits and said global syndrome code to generate a syndrome code indicative of a location of an error within any of said groups of received data bits.

2. The apparatus as recited in claim 1 wherein said control unit is configured to shift said set of parity error bits within said first shift register until a content of a given cell of said first shift register contains a logical high value.

3. The apparatus as recited in claim 2 wherein said control unit is further configured to uniformly shift said global syndrome code within said second shift register while shifting said set of parity error bits in said first shift register, until a content of said given cell of said first shift register contains said logical high value.

4. The apparatus as recited in claim 3 wherein said control unit is further configured to record a value within a corresponding cell of said second shift register when said given cell of said first shift register contains a logical high value.

5. The apparatus as recited in claim 4 wherein said value recorded in said corresponding cell of said second shift register forms a first bit of said syndrome code.

6. The apparatus as recited in claim 5 wherein said control unit is further configured to determine whether said first bit of said syndrome code is a logical high value.

7. The apparatus as recited in claim 6 wherein said control unit is further configured to conditionally combine a current content of said first shift register with a current content of said second shift register depending upon a value of said first bit of said syndrome code.

8. The apparatus as recited in claim 7 wherein said control unit is configured to combine said current contents of said first and second shift registers by performing an exclusive OR operation.

9. The apparatus as recited in claim 8 wherein said control unit is further configured to store a result of said exclusive OR operation within said second shift register.

10. The apparatus as recited in claim 9 further comprising shifting the content of said second shift register by one bit position after storing said result of said exclusive OR operation within said second shift register, and recording a value in said corresponding cell of said second shift register as a next bit of said syndrome code.

11. The apparatus as recited in claim 4 wherein said given cell of said first shift register is a right-most cell of said first shift register.

12. The apparatus as recited in claim 11 wherein said corresponding cell of said second shift register is a right-most cell of said second shift register.

13. A method for decoding a global error correction code corresponding to a plurality of data bits, wherein said global error correction code is equivalent to a predetermined combination of a set of error correction codes each individually associated with a corresponding one of said plurality of data groupings, and wherein global error correction code is expressed using a smaller number of bits than a total number of bits of said set of error correction codes, the method comprising:

generating a global syndrome code representing a difference between the global error correction code and a regenerated global error correction code, wherein the regenerated global error correction code is regenerated using a plurality of received data bits;

a first storage receiving a set of parity error bits each indicative of a parity error within a respective group of said received data bits;

a second storage receiving a global syndrome code; and selectively shifting and combining said set of parity error bits and said global syndrome code to generate a syndrome code indicative of a location of an error within any of said groups of received data bits.

14. The method as recited in claim 13 further comprising shifting said set of parity error bits within said first storage until a content of a given cell of said first storage contains a logical high value.

15. The method as recited in claim 14 further comprising uniformly shifting said global syndrome code within said second storage while shifting said set of parity error bits in said first storage, until a content of said given cell of said first storage contains said logical high value.

16. The method as recited in claim 15 further comprising recording a value within a corresponding cell of said second storage when said given cell of said first storage contains a logical high value.

17. The method as recited in claim 16 wherein said value recorded in said corresponding cell of said second storage forms a first bit of said syndrome code.

18. The method as recited in claim 17 further comprising determining whether said first bit of said syndrome code is a logical high value.

19. The method as recited in claim 18 further comprising conditionally combining a current content of said first storage with a current content of said second storage depending upon a value of said first bit of said syndrome code.

20. The method as recited in claim 19 further comprising combining said current contents of said first and second storages by performing an exclusive OR operation.

21. The method as recited in claim 20 further comprising storing a result of said exclusive OR operation within said second storage.

22. The method as recited in claim 21 further comprising shifting the content of said second storage by one bit position after storing said result of said exclusive OR operation within said second storage, and recording a value in said corresponding cell of said second storage as a next bit of said syndrome code.

23. The method as recited in claim 16 wherein said given cell of said first storage is a right-most cell of said first storage.

24. The method as recited in claim 23 wherein said corresponding cell of said second storage is a right-most cell of said second storage.

* * * * *